(12) United States Patent
Chang et al.

(10) Patent No.: US 10,924,733 B2
(45) Date of Patent: Feb. 16, 2021

(54) DEVICE AND METHOD FOR CODING VIDEO DATA BASED ON MODE LIST INCLUDING DIFFERENT MODE GROUPS

(71) Applicant: FG Innovation Company Limited, Tuen Mun (CN)

(72) Inventors: Yao-Jen Chang, Hsinchu (TW); Hui-Yu Jiang, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/233,144

(22) Filed: Dec. 27, 2018

(65) Prior Publication Data

US 2019/0208195 A1 Jul. 4, 2019

Related U.S. Application Data

(60) Provisional application No. 62/611,932, filed on Dec. 29, 2017, provisional application No. 62/625,180, filed on Feb. 1, 2018.

(51) Int. Cl.
*H04N 19/11* (2014.01)
*H04N 19/70* (2014.01)
(Continued)

(52) U.S. Cl.
CPC ........... *H04N 19/107* (2014.11); *H04N 19/11* (2014.11); *H04N 19/132* (2014.11);
(Continued)

(58) Field of Classification Search
CPC .. H04N 19/107; H04N 19/132; H04N 19/159; H04N 19/176; H04N 19/11; H04N 19/136; H04N 19/463; H04N 19/70
See application file for complete search history.

(56) References Cited

U.S. PATENT DOCUMENTS

2013/0272401 A1* 10/2013 Seregin .................... H04N 7/26
375/240.12
2014/0119439 A1* 5/2014 Guo ...................... H04N 19/593
375/240.12
(Continued)

FOREIGN PATENT DOCUMENTS

CN 103597832 A 2/2014
CN 103891283 A 6/2014
CN 104093024 A 10/2014

*Primary Examiner* — Anner N Holder
(74) *Attorney, Agent, or Firm* — ScienBiziP, P.C.

(57) ABSTRACT

A method of decoding a bitstream by an electronic device is provided. A block unit is determined from an image frame according to the bitstream. A plurality of candidate modes included in a mode list are separated in a first mode group and a second mode group. The electronics device determines whether a specific one of the candidate modes in the first mode group is replaced by one of the candidate modes in the second mode group. When the specific candidate mode in the first mode group is replaced, a prediction mode is determined from the candidate modes in the second mode group. When the specific candidate mode in the first mode group remains unchanged, the specific candidate mode in the first mode group is determined as the prediction mode. Then, the block unit of the image frame is reconstructed based on the prediction mode.

20 Claims, 12 Drawing Sheets

(51) Int. Cl.
*H04N 19/107* (2014.01)
*H04N 19/132* (2014.01)
*H04N 19/136* (2014.01)
*H04N 19/159* (2014.01)
*H04N 19/176* (2014.01)
*H04N 19/463* (2014.01)

(52) U.S. Cl.
CPC ......... *H04N 19/136* (2014.11); *H04N 19/159* (2014.11); *H04N 19/176* (2014.11); *H04N 19/463* (2014.11); *H04N 19/70* (2014.11)

(56) References Cited

U.S. PATENT DOCUMENTS

| | | |
|---|---|---|
| 2014/0219342 A1 | 8/2014 | Yu et al. |
| 2017/0353730 A1 | 12/2017 | Liu et al. |
| 2019/0238840 A1* | 8/2019 | Jang ........................ H04N 19/11 |
| 2020/0275124 A1* | 8/2020 | Ko ........................ H04N 19/11 |

* cited by examiner

DEVICE AND METHOD FOR CODING VIDEO DATA BASED ON MODE LIST INCLUDING DIFFERENT MODE GROUPS

CROSS-REFERENCE TO RELATED APPLICATION(S)

The present application claims the benefit of and priority to a provisional U.S. Patent Application Ser. No. 62/611,932 filed on Dec. 29, 2017, entitled "Chroma Prediction Method" (hereinafter referred to as "US72978 application") and a provisional U.S. Patent Application Ser. No. 62/625,180 filed on Feb. 1, 2018, entitled "Intra Prediction Method" (hereinafter referred to as "US73182 application"). The disclosures of the US72978 and US73182 applications are hereby incorporated fully by reference into the present application.

FIELD

The present disclosure generally relates to video coding, and more particularly, to techniques for intra prediction based on an adjusted intra mode list.

BACKGROUND

The intra prediction is a coding tool for video coding. In a conventional video coding method, an encoder and a decoder only use the previously reconstructed pixels in a closest pixel line adjacent to a coding block to generate reference pixels and predictors for predicting or reconstructing the coding block along an orientation. However, the orientation is selected from a plurality of intra modes included in a predefined mode list. Thus, the encoder needs to adjust the predefined mode list for adapting to different coding blocks. When the encoder adjusts the predefined mode list for adapting to different coding blocks, the decoder needs to adjust the predefined mode list to adapt to different coding blocks in the same way.

SUMMARY

The present disclosure is directed to a device and method for coding video data based on multiple-reference lines.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
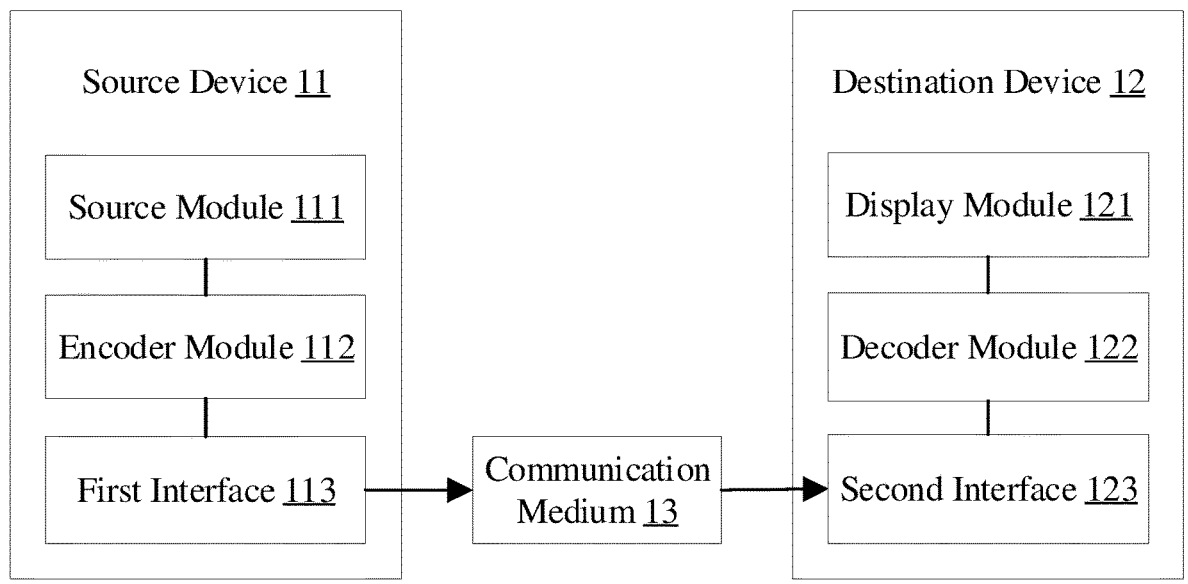
FIG. 1 is a block diagram of an exemplary implementation of a system configured to encode and decode video data according to one or more techniques of this disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any coding function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 is a block diagram of an exemplary implementation of a system that may be configured to encode and decode video data according to one or more techniques of this disclosure. In the implementation, the system includes a source device 11, a destination device 12, and communication medium 13. In at least one implementation, the source device 11 may include any device configured to encode video data and transmit encoded video data to the communication medium 13. In at least one implementation, the destination device 12 may include any device configured to receive encoded video data via the communication medium 13 and to decode encoded video data.

In at least one implementation, the source device 11 may wiredly and/or wirelessly communicate with the destination device 12 via the communication medium 13. The source device 11 may include a source module 111, an encoder module 112, and a first interface 113. The destination device 12 may include a display module 121, a decoder module 122, and a second interface 123. In at least one implementation, the source device 11 may be a video encoder, and the destination device 12 may be a video decoder.

In at least one implementation, the source device 11 and/or the destination device 12 may be a mobile phone, a tablet, a desktop, a notebook, or other electronic device. FIG. 1 merely illustrates one example of the source device 11 and the destination device 12, and the source device 11 and the destination device 12 in other implementations may include more or less components than illustrated, or have a different configuration of the various components.

In at least one implementation, the source module 111 of the source device 11 may include a video capture device to capture a new video, a video archive storing previously captured video, and/or a video feed interface to receive video from a video content provider. In at least one implementation, the source module 111 of the source device 11 may generate computer graphics-based data as the source video, or a combination of live video, archived video, and computer-generated video. In at least one implementation, the video capturing device may be a charge-coupled device (CCD) image sensor, a complementary metal-oxide-semiconductor (CMOS) image sensor, or a camera.

In at least one implementation, the encoder module 112 and the decoder module 122 may each be implemented as any of a variety of suitable encoder/decoder circuitry, such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. In at least one implementation, each of the encoder module 112 and the decoder module 122 may be included in one or more encoders or decoders, any of which may be integrated as part of a combined encoder/decoder (CODEC) in a respective device.

In at least one implementation, the first interface 113 and the second interface 123 may adopt customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In at least one implementation, the first interface 113 and the second interface 123 may each include any device configured to transmit and/or store a compliant video bitstream to the communication medium 13 and to receive the compliant video bitstream from the communication medium 13. In at least one implementation, the first interface 113 and the second interface 123 may include a computer system interface that may enable a compliant video bitstream to be stored on a storage device or to be received from the storage device. For example, the first interface 113 and the second interface 123 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

In at least one implementation, the display module 121 may include a display using liquid crystal display (LCD) technology, a plasma display technology, an organic light emitting diode (OLED) display technology, or light emitting polymer display (LPD) technology, although other display technologies may be used in other implementations. In at least one implementation, the display module 121 may include a high definition display or an ultra high definition display.

Figure 2:
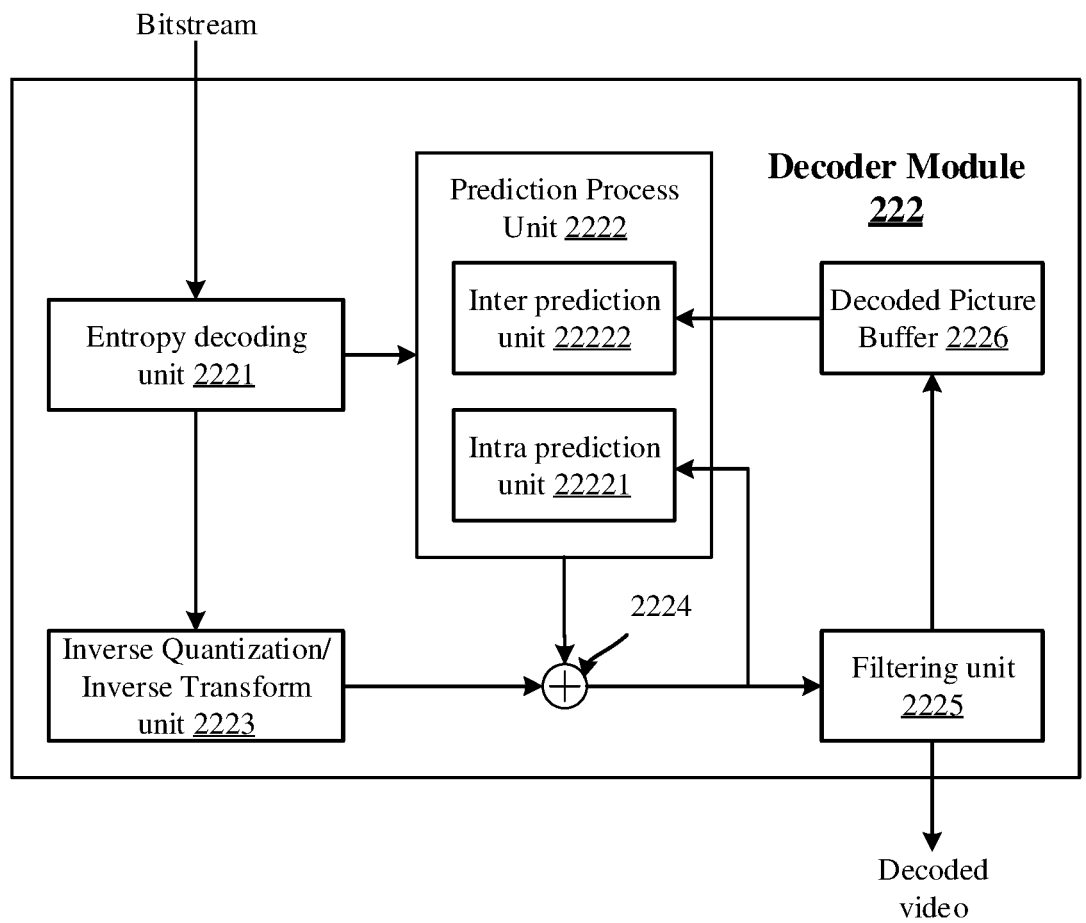
FIG. 2 is a block diagram of an exemplary implementation of the decoder module of the destination device in the system of FIG. 1.

FIG. 2 is a block diagram of a decoder module 222 representing an exemplary implementation of the decoder module 122 of the destination device 12 in the system of FIG. 1. In at least one implementation, the decoder module 222 includes an entropy decoding unit 2221, a prediction process unit 2222, an inverse quantization/inverse transform unit 2223, a first summer 2224, a filtering unit 2225, and a decoded picture buffer 2226. In at least one implementation, the prediction process unit 2222 of the decoder module 222 further includes an intra prediction unit 22221, and an inter prediction unit 22222. In at least one implementation, the decoder module 222 receives a bitstream, and decodes the bitstream to output a decoded video.

In at least one implementation, the entropy decoding unit 2221 may receive the bitstream including a plurality of syntax elements from the second interface 123 in FIG. 1, and perform a parsing operation on the bitstream to extract syntax elements from the bitstream. As part of performing the parsing operation, the entropy decoding unit 2221 may entropy decode the bitstream to generate quantized transform coefficients, quantization parameters, transform data, motion vectors, intra modes, partition information, and other syntax information. In at least one implementation, the entropy decoding unit 2221 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2221 provides the quantized transform coefficients, the quantization parameters, and the transform data to the inverse quantization/inverse transform unit 2223, and provides the motion vectors, the intra modes, the partition information, and other syntax information to the prediction process unit 2222.

In at least one implementation, the prediction process unit 2222 may receive syntax elements, such as motion vectors, intra modes, partition information, and other syntax information, from the entropy decoding unit 2221. In at least one implementation, the prediction process unit 2222 may receive the syntax elements including the partition information, and then divide image frames according to the partition information. In at least one implementation, each of the image frames may be divided into at least one image block according to the partition information. The at least one image block may include a luminance block for reconstructing a plurality of luminance samples, and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction process unit 2222 receives predicted data including the intra mode or the motion vector for a current image block of a specific one of the image frames. The current image block may be one of the luminance block and the at least one of the chrominance block in the specific image frame.

In at least one implementation, the intra prediction unit 22221 may perform intra-predictive coding of a current block unit relative to one or more neighboring blocks in the same frame as the current block unit based on the syntax elements related to the intra mode to generate a predicted block. In at least one implementation, the intra mode may specify the location of reference samples selected from the neighboring blocks within the current frame.

In at least one implementation, the intra prediction unit 22221 may reconstruct a plurality of chroma components of the current block unit based on the plurality of luma components of the current block unit, when the luma components of the current block are reconstructed by the prediction process unit 2222.

In at least one implementation, the inter prediction unit 22222 may perform inter-predictive coding of the current block unit relative to one or more blocks in one or more reference image block based on the syntax elements related to the motion vector to generate the predicted block. In at least one implementation, the motion vector may indicate a displacement of the current block unit within the current image block relative to a reference block unit within the reference image block. The reference block unit is a block that is determined to closely match the current block unit. In at least one implementation, the inter prediction unit 22222 receives the reference image block stored in the decoded picture buffer 2226 and reconstructs the current block unit based on the received reference image blocks.

In at least one implementation, the inverse quantization/inverse transform unit 2223 may apply inverse quantization and inverse transformation to reconstruct the residual block in the pixel domain. In at least one implementation, the inverse quantization/inverse transform unit 2223 may apply inverse quantization to the residual quantized transform coefficient to generate a residual transform coefficient, and then apply inverse transformation to the residual transform coefficient to generate the residual block in the pixel domain.

In at least one implementation, the inverse transformation may be inversely applied the transformation process, such as discrete cosine transform (DCT), discrete sine transform (DST), adaptive multiple transform (AMT), mode-dependent non-separable secondary transform (MDNSST), hyper-cube-givens transform (HyGT), signal dependent transform, Karhunen-Loéve transform (KLT), wavelet transform, integer transform, sub-band transform or a conceptually similar transform. In at least one implementation, the inverse transformation may convert the residual information from a transform domain, such as a frequency domain, back to the pixel domain. In at least one implementation, the degree of inverse quantization may be modified by adjusting a quantization parameter.

In at least one implementation, the first summer 2224 adds the reconstructed residual block to the predicted block provided from the prediction process unit 2222 to produce a reconstructed block.

In at least one implementation, the filtering unit 2225 may include a deblocking filter, a sample adaptive offset (SAO) filter, a bilateral filter, and/or an adaptive loop filter (ALF) to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the first summer 2224. In at least one implementation, the filtering unit 2225 may output the decoded video to the display module 121 or other video receiving unit, after the filtering unit 2225 performs the filtering process for the reconstructed blocks of the specific image frame.

In at least one implementation, the decoded picture buffer 2226 may be a reference picture memory that stores the reference block for use in decoding the bitstream by the prediction process unit 2222, e.g., in inter-coding modes. The decoded picture buffer 2226 may be formed by any of a variety of memory devices, such as dynamic random access memory (DRAM), including synchronous DRAM (SDRAM), magneto-resistive RAM (MRAM), resistive RAM (RRAM), or other types of memory devices. In at least one implementation, the decoded picture buffer 2226 may be on-chip with other components of the decoder module 222, or off-chip relative to those components.

Figure 3:
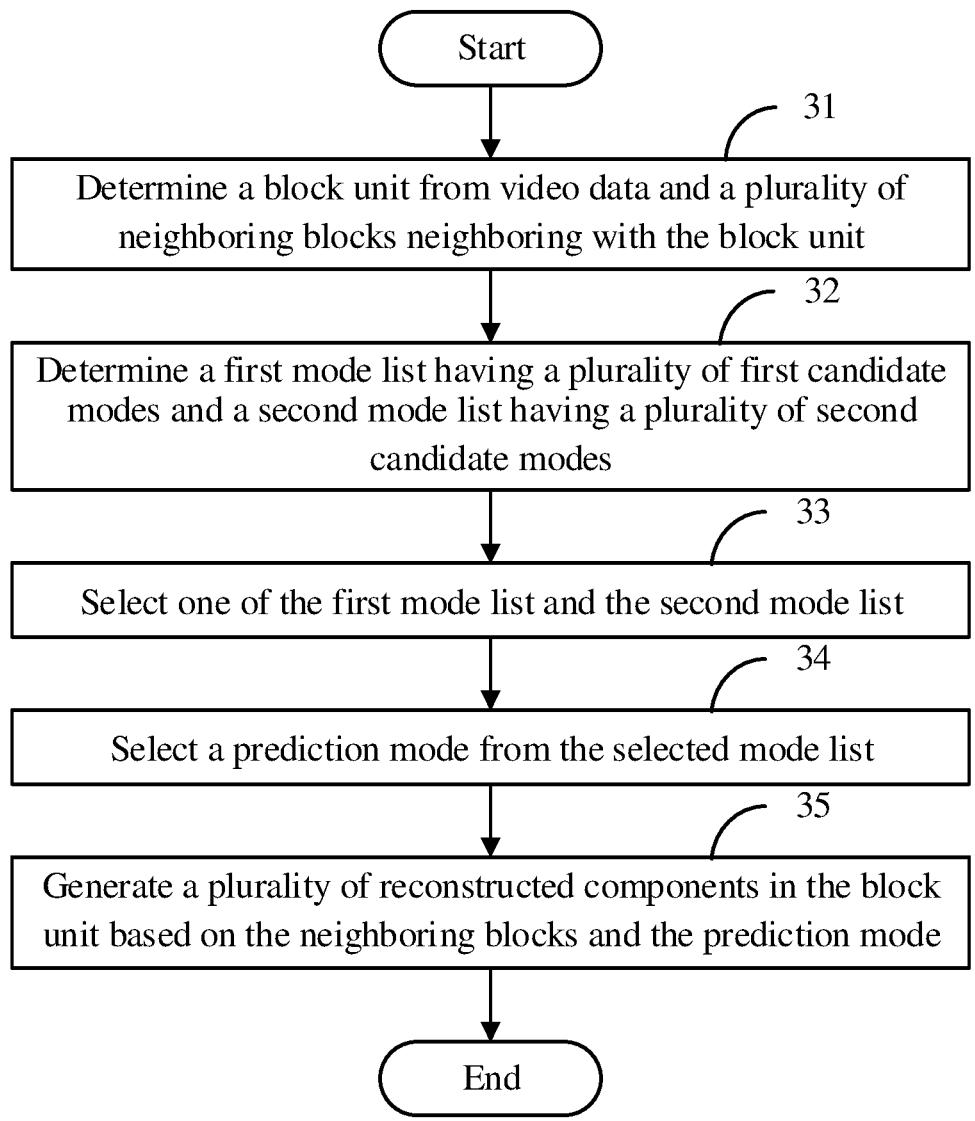
FIG. 3 illustrates a flowchart in accordance with a first exemplary implementation of the mode list adjustment for intra prediction.

FIG. 3 illustrates a flowchart in accordance with a first exemplary implementation of the mode list adjustment for intra prediction. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 3 represents one or more processes, methods, or subroutines, carried out in the example method. Furthermore, the order of blocks is illustrative only and may change. Additional blocks may be added or less blocks may be utilized without departing from this disclosure.

At block 31, the decoder module 222 determines a block unit in an image frame from video data, and determines a plurality of neighboring blocks neighboring with the block unit.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indications in the bitstream. For example, the decoder module 222 may divide the image frames to generate a plurality of coding tree units, and further divide one of the coding tree units to determine the block unit having a block size according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

Figure 4:
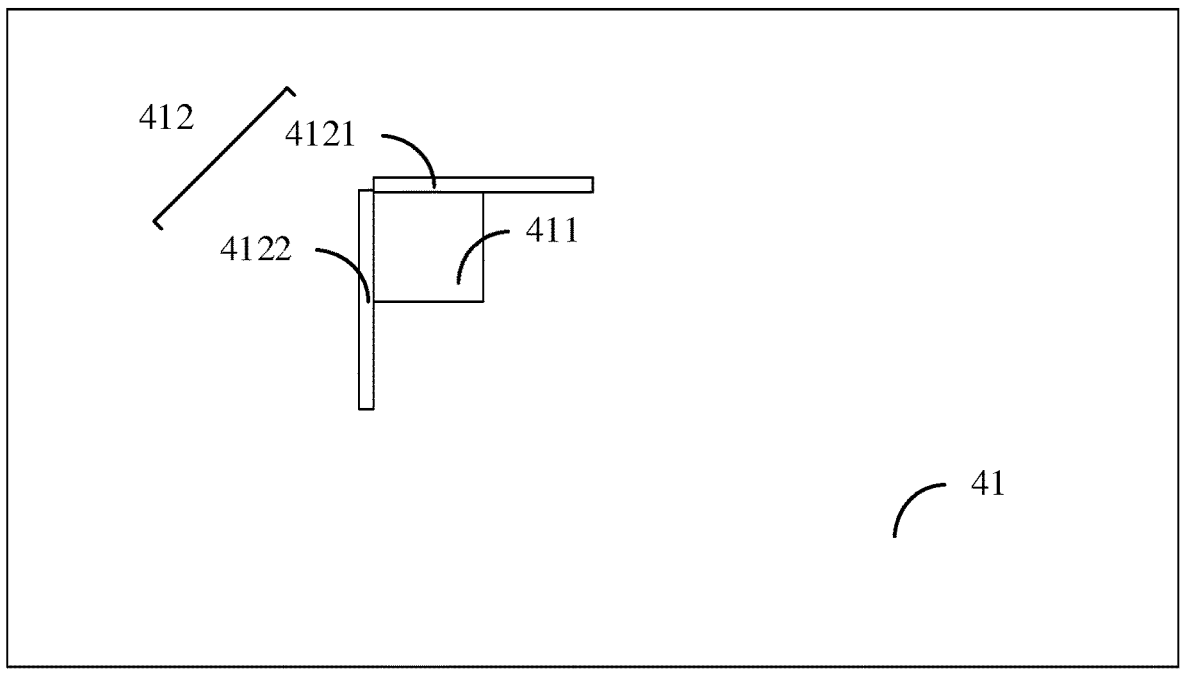
FIG. 4 is a schematic illustration of one exemplary implementation of an image frame having a block unit.

In at least one implementation, the prediction process unit 2222 of the destination device 12 determines the neighboring blocks neighboring with the block unit. In at least one implementation, the neighboring blocks may be reconstructed prior to reconstructing the block unit, so the neighboring blocks may include a plurality of reference samples for reconstructing the block unit. In at least one implementation, the block unit may be reconstructed prior to reconstructing some of the neighboring blocks, so the unreconstructed neighboring blocks may not include the reference samples for the block unit. FIG. 4 is a schematic illustration of one exemplary implementation of an image frame 41 having a block unit 411. The prediction process unit 2222 may receive the reference samples 412 neighboring with the block unit 411. The reference samples 412 includes a plurality of first reference samples 4121 located above the block unit 411 and a plurality of second reference samples 4122 located in the left of the block unit 411.

Referring back to FIG. 3, at block 32, the intra prediction unit 22221 determines a first mode list having a plurality of first candidate modes and a second mode list having a plurality of second candidate modes.

In at least one implementation, the first candidate modes and the second candidate modes are selected from a plurality of intra modes. In one implementation, at least one of the first candidate modes may be identical to at least one of the second candidate modes. In another implementation, each of the first candidate modes may be different from the second candidate modes.

Table 1 schematically shows an exemplary implementation where indices are assigned to the intra modes each having an intra prediction angle. In the implementation, each of the first candidate modes and the second candidate modes may correspond to one of a planar mode, a DC mode, and a plurality of intra modes 2-66 in Table 1.

TABLE 1

| | \multicolumn{16}{c|}{Intra mode} |
|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 |
| IntraPredAngle | 32 | 29 | 26 | 23 | 21 | 19 | 17 | 15 | 13 | 11 | 9 | 7 | 5 | 3 | 2 | 1 |
| | \multicolumn{16}{c|}{Intra mode} |
| | 18 | 19 | 20 | 21 | 22 | 23 | 24 | 25 | 26 | 27 | 28 | 29 | 30 | 31 | 32 | 33 |
| IntraPredAngle | 0 | −1 | −2 | −3 | −5 | −7 | −9 | −11 | −13 | −15 | −17 | −19 | −21 | −23 | −26 | −29 |
| | \multicolumn{16}{c|}{Intra mode} |
| | 34 | 35 | 36 | 37 | 38 | 39 | 40 | 41 | 42 | 43 | 44 | 45 | 46 | 47 | 48 | 49 |
| IntraPredAngle | −32 | −29 | −26 | −23 | −21 | −19 | −17 | −15 | −13 | −11 | −9 | −7 | −5 | −3 | −2 | −1 |
| | \multicolumn{16}{c|}{Intra mode} |
| | 50 | 51 | 52 | 53 | 54 | 55 | 56 | 57 | 58 | 69 | 60 | 61 | 62 | 63 | 64 | 65 | 66 |
| IntraPredAngle | 0 | 1 | 2 | 3 | 5 | 7 | 9 | 11 | 13 | 15 | 17 | 19 | 21 | 23 | 26 | 29 | 32 |

Table 2 schematically shows an exemplary implementation where indices are assigned to the intra modes each having an intra prediction angle. In the implementation, each of the first candidate modes and the second candidate modes may correspond to one of a planar mode, a DC mode, and the intra modes 2-70 in Table 2.

TABLE 2

| | \multicolumn{17}{c|}{Intra mode} |
|---|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 | 18 |
| IntraPredAngle | 32 | 29 | 26 | 23 | 21 | 19 | 17 | 15 | 13 | 11 | 9 | 7 | 5 | 4 | 3 | 2 | 1 |
| | \multicolumn{17}{c|}{Intra mode} |
| | 19 | 20 | 21 | 22 | 23 | 24 | 25 | 26 | 27 | 28 | 29 | 30 | 31 | 32 | 33 | 34 | 35 |
| IntraPredAngle | 0 | −1 | −2 | −3 | −4 | −5 | −7 | −9 | −11 | −13 | −15 | −17 | −19 | −21 | −23 | −26 | −29 |

TABLE 2-continued

| | Intra mode | | | | | | | | | | | | | | | | |
|---|---|---|---|---|---|---|---|---|---|---|---|---|---|---|---|---|---|
| | 36 | 37 | 38 | 39 | 40 | 41 | 42 | 43 | 44 | 45 | 46 | 47 | 48 | 49 | 50 | 51 | 52 |
| IntraPredAngle | −32 | −29 | −26 | −23 | −21 | −19 | −17 | −15 | −13 | −11 | −9 | −7 | −5 | −4 | −3 | −2 | −1 |

| | Intra mode | | | | | | | | | | | | | | | | |
|---|---|---|---|---|---|---|---|---|---|---|---|---|---|---|---|---|---|
| | 53 | 54 | 55 | 56 | 57 | 58 | 59 | 60 | 61 | 62 | 63 | 64 | 65 | 66 | 67 | 68 | 69 | 70 |
| IntraPredAngle | 0 | 1 | 2 | 3 | 4 | 5 | 7 | 9 | 11 | 13 | 15 | 17 | 19 | 21 | 23 | 26 | 29 | 32 |

In at least one implementation, the intra prediction unit 22221 may select the first candidate modes and the second candidate modes based on the first example in Table 1, the second example in Table 2, and other predefined prediction mode list. For example, the intra prediction unit 22221 may select the planar mode, the DC mode, and all of the intra mode 2-66 in Table 2 to be the first candidate modes, and select the planar mode, the DC mode, and all of the intra mode 2, 4, and 6-70 in Table 2 to be the second candidate modes.

At block 33, the intra prediction unit 22221 selects one of the first mode list and the second mode list.

In at least one implementation, the entropy decoding unit 2221 may decode the bitstream to determine a list flag for the block unit, and then the decoder module 222 may further reconstruct the block unit based on the list flag. In at least one implementation, the intra prediction unit 22221 may generate the selected mode list from the first mode list and the second mode list based on the list flag.

In at least one implementation, the intra prediction unit 22221 may directly determine, without the list flag, which one of the first mode list and the second mode list is selected for the block unit 411. In one implementation, the intra prediction unit 22221 may determine whether the neighboring blocks include the reference samples for determining how to select one of the first mode list and the second mode list. In another implementation, the intra prediction unit 22221 may determine how to select one of the first mode list and the second mode list based on a block size of the block unit 411.

At block 34, the intra prediction unit 22221 selects a prediction mode from the selected mode list.

In at least one implementation, the entropy decoding unit 2221 may decode the bitstream to determine an orientation flag for the block unit. In one implementation, the intra prediction unit 22221 may select the prediction mode from the selected mode list based on the orientation flag. In one implementation, the intra prediction unit 22221 may select one of the first candidate modes from the first mode list based on the orientation flag, when the selected mode list is the first mode list. Then, the intra prediction unit 22221 may set the selected first candidate mode as the prediction mode. In another implementation, the intra prediction unit 22221 may select one of the second candidate modes from the second mode list based on the orientation flag, when the selected mode list is the second mode list. Then, the intra prediction unit 22221 may set the selected second candidate mode as the prediction mode.

At block 35, the decoder module 222 generates a plurality of reconstructed components in the block unit based on the neighboring blocks and the prediction mode.

In at least one implementation, the block unit may include a plurality of block elements. In the implementation, each of the block elements may be a pixel element. In at least one implementation, the intra prediction unit 22221 may determine, along the prediction mode derived for the block unit, one of the predictors for each of the block elements based on the reference samples determined from the neighboring blocks.

In at least one implementation, the first summer 2224 of the decoder module 222 in the destination device 12 may add the predictors derived based on the prediction mode into a plurality of residual samples determined from the bitstream to reconstruct the block unit. In addition, the decoder module 222 may reconstruct all of the other block units in the image frame for reconstructing the image frame and the video.

Figure 5:
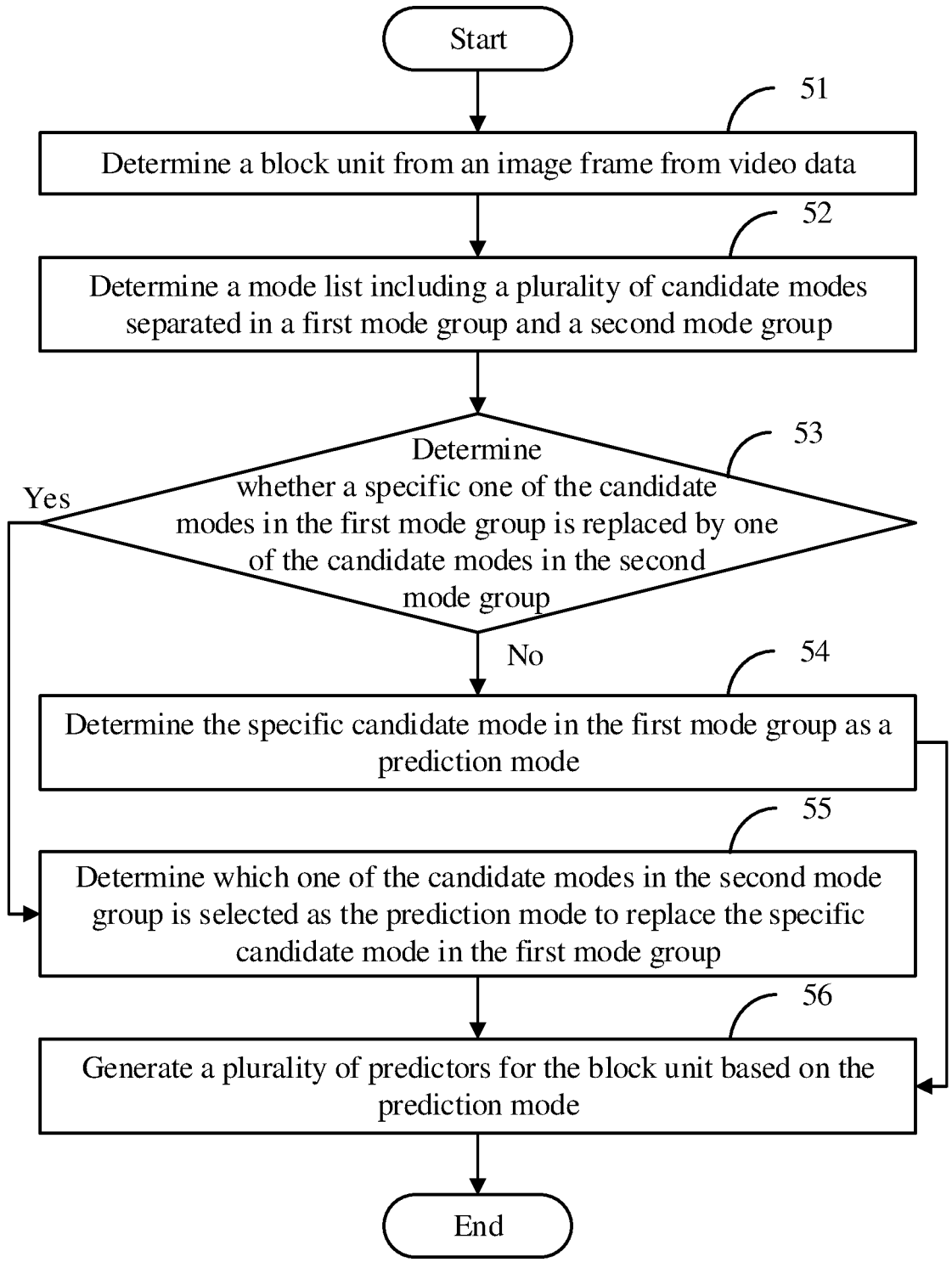
FIG. 5 illustrates a flowchart in accordance with a second exemplary implementation of the mode list adjustment for intra prediction.

FIG. 5 illustrates a flowchart in accordance with a second exemplary implementation of the mode list adjustment for intra prediction. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 5 represents one or more processes, methods, or subroutines, carried out in the example method. Furthermore, the order of blocks is illustrative only and may change. Additional blocks may be added or less blocks may be utilized without departing from this disclosure.

At block 51, the decoder module 222 determines a block unit in an image frame from video data.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indications in the bitstream. For example, the decoder module 222 may divide the image frames to generate a plurality of coding tree units, and further divide one of the coding tree units to determine the block unit having a block size according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

In at least one implementation, the prediction process unit 2222 of the destination device 12 determines the neighboring blocks neighboring with the block unit. In at least one implementation, the neighboring blocks may be reconstructed prior to reconstructing the block unit, so the neighboring blocks may include a plurality of reference samples for reconstructing the block unit. In at least one implementation, the block unit may be reconstructed prior to reconstructing some of the neighboring blocks, so the unreconstructed neighboring blocks may not include the reference samples for the block unit.

At block 52, the intra prediction unit 22221 determines a mode list including a plurality of candidate modes separated into a first mode group and a second mode group.

In at least one implementation, the candidate modes in the mode list may be predefined in the destination device 12 and the source device 11. For example, the candidate modes may be predefined as a planar mode, a DC mode, and/or a plurality of directional modes.

In at least one implementation, the intra prediction unit 22221 may divide the candidate modes into a first mode group and a second mode group. In the implementation, the candidate modes in the first mode group may be a plurality of default modes selected from the mode list, and the candidate modes in the second mode group may be a plurality of added modes selected from the mode list for replacing at least one of the default modes. In at least one implementation, the default modes in the first mode group may include a planar mode, a DC mode, and a plurality of first directional modes, and the added modes in the second mode group may include a plurality of second directional modes. In the implementation, the second directional modes may be selected to replace at least one of the first directional modes. In the implementation, each of the added modes in the second mode group is different from the default modes in the first mode group, since the candidate modes are separated into the first mode group and the second mode group.

In at least one implementation, each of the candidate modes has a prediction index. In one implementation, the prediction indices of the default modes in the first mode group may be equal to 0 to 34, when the decoder module 222 decodes the bitstream in high efficiency video coding (HEVC). In the implementation, the prediction indices of the planer mode and the DC mode may be equal to 0 and 1, and the prediction indices of the first directional modes may be equal to 2 to 33. In the implementation, the prediction indices of the added modes in the second mode group may be greater than 33 or less than 0. In one implementation, the prediction indices of the default modes in the first mode group may be equal to 0 to 66, when the decoder module 222 decodes the bitstream in versatile video coding (VVC) test model (VTM). In the implementation, the prediction indices of the planer modes and the DC mode may be equal to 0 and 1, and the prediction indices of the default modes may be equal to 2 to 66. In the implementation, the prediction indices of the added modes in the second mode group may be greater than 66 or less than 0.

Table 3 schematically shows an exemplary implementation where indices are assigned to the intra modes each having an intra prediction angle. In the implementation, each of the first candidate modes and the second candidate modes may correspond to one of a planar mode, a DC mode, and a plurality of intra modes 2-130 in Table 3.

TABLE 3

| | Intra mode | | | | | | | | | | | | | | | |
|---|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 | 16 | 17 |
| IntraPredAngle | 64 | 61 | 58 | 55 | 52 | 49 | 46 | 44 | 42 | 40 | 38 | 36 | 34 | 32 | 30 | 28 |
| | Intra mode | | | | | | | | | | | | | | | |
| | 18 | 19 | 20 | 21 | 22 | 23 | 24 | 25 | 26 | 27 | 28 | 29 | 30 | 31 | 32 | 33 |
| IntraPredAngle | 26 | 24 | 22 | 20 | 18 | 16 | 14 | 12 | 10 | 8 | 6 | 5 | 4 | 3 | 2 | 1 |
| | Intra mode | | | | | | | | | | | | | | | |
| | 34 | 35 | 36 | 37 | 38 | 39 | 40 | 41 | 42 | 43 | 44 | 45 | 46 | 47 | 48 | 49 |
| IntraPredAngle | 0 | −1 | −2 | −3 | −4 | −5 | −6 | −8 | −10 | −12 | −14 | −16 | −18 | −20 | −22 | −24 |
| | Intra mode | | | | | | | | | | | | | | | |
| | 50 | 51 | 52 | 53 | 54 | 55 | 56 | 57 | 58 | 69 | 60 | 61 | 62 | 63 | 64 | 65 |
| IntraPredAngle | −26 | −28 | −30 | −32 | −34 | −36 | −38 | −40 | −42 | −44 | −46 | −49 | −52 | −55 | −58 | −61 |
| | Intra mode | | | | | | | | | | | | | | | |
| | 66 | 67 | 68 | 69 | 70 | 71 | 72 | 73 | 74 | 75 | 76 | 77 | 78 | 79 | 80 | 81 |
| IntraPredAngle | −64 | −61 | −58 | −55 | −52 | −49 | −46 | −44 | −42 | −40 | −38 | −36 | −34 | −32 | −30 | −28 |
| | Intra mode | | | | | | | | | | | | | | | |
| | 82 | 83 | 84 | 85 | 86 | 87 | 88 | 89 | 90 | 91 | 92 | 93 | 94 | 95 | 96 | 97 |
| IntraPredAngle | −26 | −24 | −22 | −20 | −18 | −16 | −14 | −12 | −10 | −8 | −6 | −5 | −4 | −3 | −2 | −1 |
| | Intra mode | | | | | | | | | | | | | | | |
| | 98 | 99 | 100 | 101 | 102 | 103 | 104 | 105 | 106 | 107 | 108 | 109 | 110 | 111 | 112 | 113 |
| IntraPredAngle | 0 | 1 | 2 | 3 | 4 | 5 | 6 | 8 | 10 | 12 | 14 | 16 | 18 | 20 | 22 | 24 |

TABLE 3-continued

| | Intra mode | | | | | | | | | | | | | | | | |
|---|---|---|---|---|---|---|---|---|---|---|---|---|---|---|---|---|---|
| | 114 | 115 | 116 | 117 | 118 | 119 | 120 | 121 | 122 | 123 | 124 | 125 | 126 | 127 | 128 | 129 | 130 |
| IntraPredAngle | 26 | 28 | 30 | 32 | 34 | 36 | 38 | 40 | 42 | 44 | 46 | 49 | 52 | 55 | 58 | 61 | 64 |

Table 4 schematically shows an exemplary implementation where indices are assigned to the intra modes each having an intra prediction angle. In the implementation, each of the first candidate modes and the second candidate modes may correspond to one of a planar mode, a DC mode, and the intra modes −14--1 and 2-80 in the table 4.

TABLE 4

| | Intra mode | | | | | | | | | | | | | | | | |
|---|---|---|---|---|---|---|---|---|---|---|---|---|---|---|---|---|---|
| | −14 | −13 | −12 | −11 | −10 | −9 | −8 | −7 | −6 | −5 | −4 | −3 | −2 | −1 | 2 | 3 | 4 |
| IntraPredAngle | 512 | 341 | 256 | 171 | 128 | 102 | 86 | 73 | 64 | 57 | 51 | 45 | 39 | 35 | 32 | 29 | 26 |

| | Intra mode | | | | | | | | | | | | | | | | |
|---|---|---|---|---|---|---|---|---|---|---|---|---|---|---|---|---|---|
| | 5 | 6 | 7 | 8 | 9 | 10 | 11 | 12 | 13 | 14 | 15 | 16 | 17 | 18 | 19 | 20 | 21 |
| IntraPredAngle | 23 | 20 | 18 | 16 | 14 | 12 | 10 | 8 | 6 | 4 | 3 | 2 | 1 | 0 | −1 | −2 | −3 |

| | Intra mode | | | | | | | | | | | | | | | | |
|---|---|---|---|---|---|---|---|---|---|---|---|---|---|---|---|---|---|
| | 22 | 23 | 24 | 25 | 26 | 27 | 28 | 29 | 30 | 31 | 32 | 33 | 34 | 35 | 36 | 37 | 38 |
| IntraPredAngle | −4 | −6 | −8 | −10 | −12 | −14 | −16 | −18 | −20 | −23 | −26 | −29 | −32 | −29 | −26 | −23 | −20 |

| | Intra mode | | | | | | | | | | | | | | | | |
|---|---|---|---|---|---|---|---|---|---|---|---|---|---|---|---|---|---|
| | 39 | 40 | 41 | 42 | 43 | 44 | 45 | 46 | 47 | 48 | 49 | 50 | 51 | 52 | 53 | 54 | 55 |
| IntraPredAngle | −18 | −16 | −14 | −12 | −10 | −8 | −6 | −4 | −3 | −2 | −1 | 0 | 1 | 2 | 3 | 4 | 6 |

| | Intra mode | | | | | | | | | | | | | | | | |
|---|---|---|---|---|---|---|---|---|---|---|---|---|---|---|---|---|---|
| | 56 | 57 | 58 | 59 | 60 | 61 | 62 | 63 | 64 | 65 | 66 | 67 | 68 | 69 | 70 | 71 | 72 |
| IntraPredAngle | 8 | 10 | 12 | 14 | 16 | 18 | 20 | 23 | 26 | 29 | 32 | 35 | 39 | 45 | 51 | 57 | 64 |

| | Intra mode | | | | | | | |
|---|---|---|---|---|---|---|---|---|
| | 73 | 74 | 75 | 76 | 77 | 78 | 79 | 80 |
| IntraPredAngle | 73 | 86 | 102 | 128 | 171 | 256 | 341 | 512 |

In at least one implementation, the intra prediction unit 22221 may select the first candidate modes and the second candidate modes based on the third example in Table 3, the fourth example in Table 4, and other predefined prediction mode list. For example, the candidate modes in the mode list may include the first mode group having the planar mode, the DC mode, and the intra modes 2-66 in Table 4, and the second mode group having the intra modes −14--1 and 67-80 in Table 4. In the implementation, the planar mode, the DC mode, and the intra modes 2-66 in the first mode group are the default modes, and the intra modes −14--1 and 67-80 in the second mode group are the added modes.

At block 53, the intra prediction unit 22221 determines whether a specific one of the candidate modes in the first mode group is replaced by one of the candidate modes in the second mode group.

In at least one implementation, the entropy decoding unit 2221 may decode the bitstream to determine a replacement flag and an orientation index for the block unit, and then the decoder module 222 may further reconstruct the block unit based on the replacement flag and the orientation index. In at least one implementation, the intra prediction unit 22221 may determine the specific candidate mode in the first mode group based on the orientation index, and determine whether the specific candidate mode in the first mode group is replaced by one of the candidate modes in the second mode group based on the replacement flag.

In at least one implementation, the entropy decoding unit 2221 may decode the bitstream to determine the orientation index for the block unit to determine the specific candidate mode in the first mode group. In the implementation, there may be no replacement flag in the bitstream for the specific candidate mode in the first mode group. In the implementation, the intra prediction unit 22221 may directly determine, without the replacement flag, whether the specific candidate mode in the first mode group is replaced by one of the candidate modes in the second mode group. In one implementation, the intra prediction unit 22221 may determine whether the neighboring blocks include the reference samples for determining whether to replace at least one of the candidate modes in the first group by at least one of the candidate modes in the second mode group. In one implementation, all of the candidate modes in the first mode group is not replaced by the candidate modes in the second mode group, so the intra prediction unit 22221 may determine that the specific candidate modes in the first mode group is not replaced by the candidate modes in the second mode group. In another implementation, the intra prediction unit 22221 may determine that the at least one of the candidate modes in the first mode group is replaced by at least one of the candidate modes in the second mode group according to the relationship between the neighboring blocks and the reference samples. Then, the intra prediction unit 22221 further determines which of the candidate modes in the first mode candidate is selected and replaced by the at least one of the candidate modes in the second mode group. In one implementation, the intra prediction unit 22221 determines that the specific candidate mode in the first mode group is replaced by one of the at least one of the candidate modes in the second mode group, if the specific candidate mode in the first mode group is selected to be replaced. In another implementation, the intra prediction unit 22221 determines that the specific candidate mode in the first mode group is not replaced by the candidate modes in the second mode group, if the specific candidate mode in the first mode group is not selected.

In at least one implementation, the intra prediction unit 22221 may determine based on a block size of the block unit 411 whether to replace at least one of the candidate modes in the first group by at least one of the candidate modes in the second mode group. When a block width is equal to a block height, the intra prediction unit 22221 may determine that the at least one of the candidate modes in the first group is not replaced by the at least one of the candidate modes in the second mode group. When the block width is different from the block height, the intra prediction unit 22221 may determine that the at least one of the candidate modes in the first group is replaced by the at least one of the candidate modes in the second mode group. Then, the intra prediction unit 22221 further determines which of the candidate modes in the first mode candidate is selected and replaced by the at least one of the candidate modes in the second mode group for checking whether the specific candidate modes in the first mode group is selected or not.

At block 54, the intra prediction unit 22221 determines the specific candidate mode in the first mode group as a prediction mode.

In at least one implementation, the intra prediction unit 22221 may directly set the specific candidate mode in the first mode group as the prediction mode based on the orientation index.

At block 55, the intra prediction unit 22221 determines which one of the candidate modes in the second mode group is selected as the prediction mode to replace the specific candidate mode in the first mode group.

In at least one implementation, the intra prediction unit 22221 determines that the at least one of the candidate modes in the first mode group is replaced by the at least one of the candidate modes in the second mode group. In the implementation, the number of the at least one of the candidate modes in the first mode group is equal to the number of the at least one of the candidate modes in the second mode group. In addition, each of the at least one of the candidate modes in the first mode group corresponds to one of the at least one of the candidate mode in the second mode group. Thus, the intra prediction unit 22221 further determine which one of the at least one of the candidate modes in the second mode group corresponds to the specific candidate mode in the first mode group. Then, the intra prediction unit 22221 sets the determined candidate mode in the second mode group corresponding to the specific candidate mode in the first mode group as the prediction mode.

At block 56, the decoder module 222 generates a plurality of predictors in the block unit based on the prediction mode.

In at least one implementation, the block unit may include a plurality of block elements. In the implementation, each of the block elements may be a pixel element. In at least one implementation, the intra prediction unit 22221 may determine, along the prediction mode derived for the block unit, one of the predictors for each of the block elements based on the reference samples determined from the neighboring blocks.

In at least one implementation, the first summer 2224 of the decoder module 222 in the destination device 12 may add the predictors derived based on the prediction mode into a plurality of residual samples determined from the bitstream to reconstruct the block unit. In addition, the decoder module 222 may reconstruct all of the other block units in the image frame for reconstructing the image frame and the video.

Figure 6A:
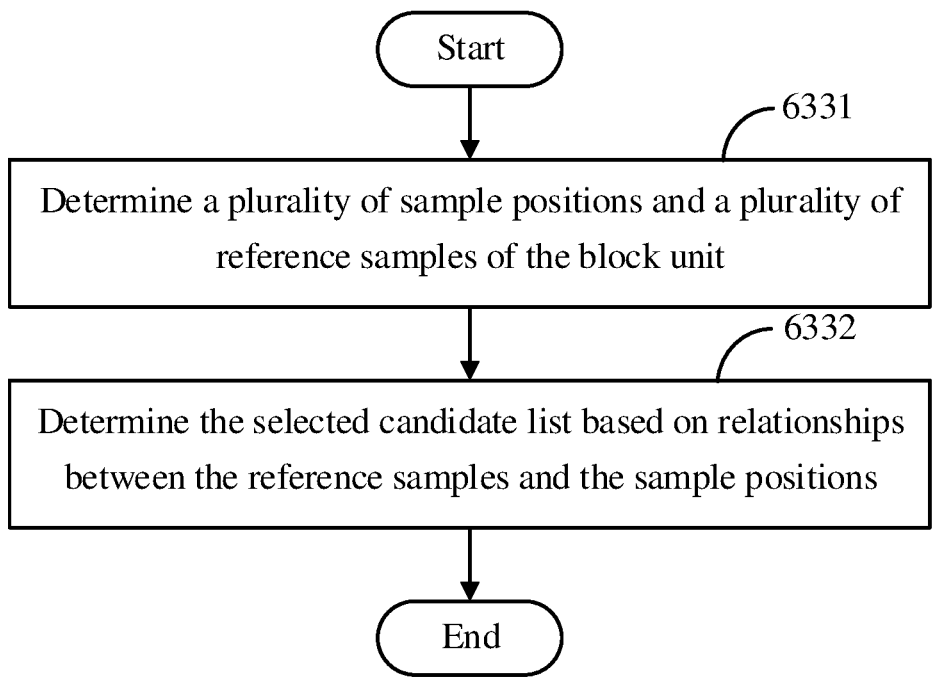
FIGS. 6A and 6B illustrate flowcharts in accordance with a third exemplary implementation and a fourth exemplary implementation, respectively, of the mode list adjustment for intra prediction.

FIG. 6A illustrates a flowchart in accordance with a third exemplary implementation of the mode list adjustment for intra prediction. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 6A represents one or more processes, methods, or subroutines, carried out in the example method. Furthermore, the order of blocks is illustrative only and may change. Additional blocks may be added or less blocks may be utilized without departing from this disclosure. In one implementation, FIG. 6A may be a detailed exemplary implementation of block 33 in FIG. 3.

At block 6331, the intra prediction unit 22221 determines a plurality of sample positions and a plurality of reference samples of the block unit.

Figure 7A:
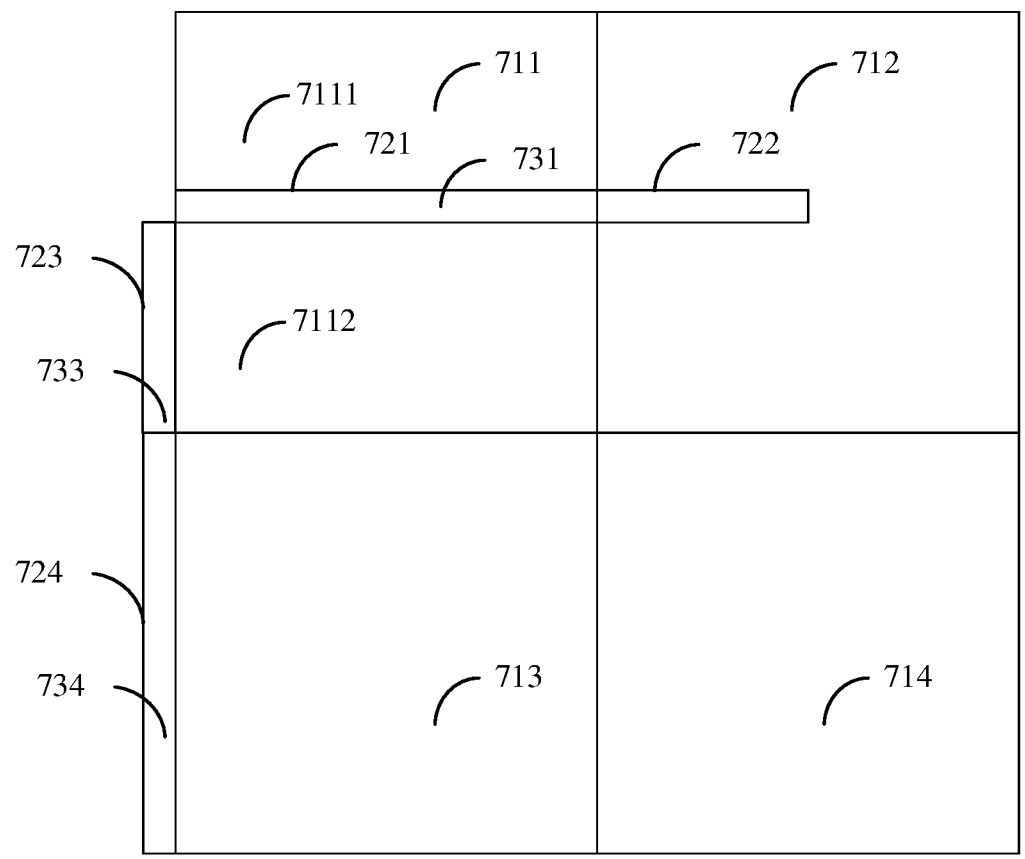
FIGS. 7A and 7B are schematic illustrations of exemplary implementations of the block unit and the reference samples of the block unit.

In at least one implementation, the image frame includes a plurality of block units having a first block unit, a second block unit, a third block unit, and a fourth block unit. FIG. 7A is a schematic illustration of one exemplary implementation of the first block unit 711, the second block unit 712, the third block unit 713, the fourth block unit 714, and the reference samples 731, 733 and 734 of the first block unit 711. In the implementation, the first block unit 711 further includes a first sub-block unit 7111 and a second sub-block unit 7112. In one implementation, the intra prediction unit 22221 may determine a first sample position 721, a second sample position 722, a third sample position 723, and a fourth sample position 724 for the second sub-block unit 7112, when the decoder module 222 reconstructs the second sub-block unit 7112. In the implementation, the first sample position 721 may be an Above position, the second sample position 722 may be an AboveRight position, the third sample position 723 may be a Left position, and the fourth sample position 724 may be a BelowLeft position. In at least one implementation, the first sub-block unit 7111 may be reconstructed prior to reconstructing the second sub-block unit 7112, so the first sample position 721 may include the first reference samples 731 for reconstructing the block unit. In at least one implementation, the second sub-block unit 7112 may be reconstructed prior to reconstructing the second block unit 712, so there is no reference sample at the second sample position 722 for reconstructing the second sub-block unit 7112. In one implementation, the third sample position 723 may include the second reference samples 733, when there is a previous decoded block located in the left of the block units 711-714. In addition, the fourth sample position 724 may include the third reference samples 734.

Figure 7B:
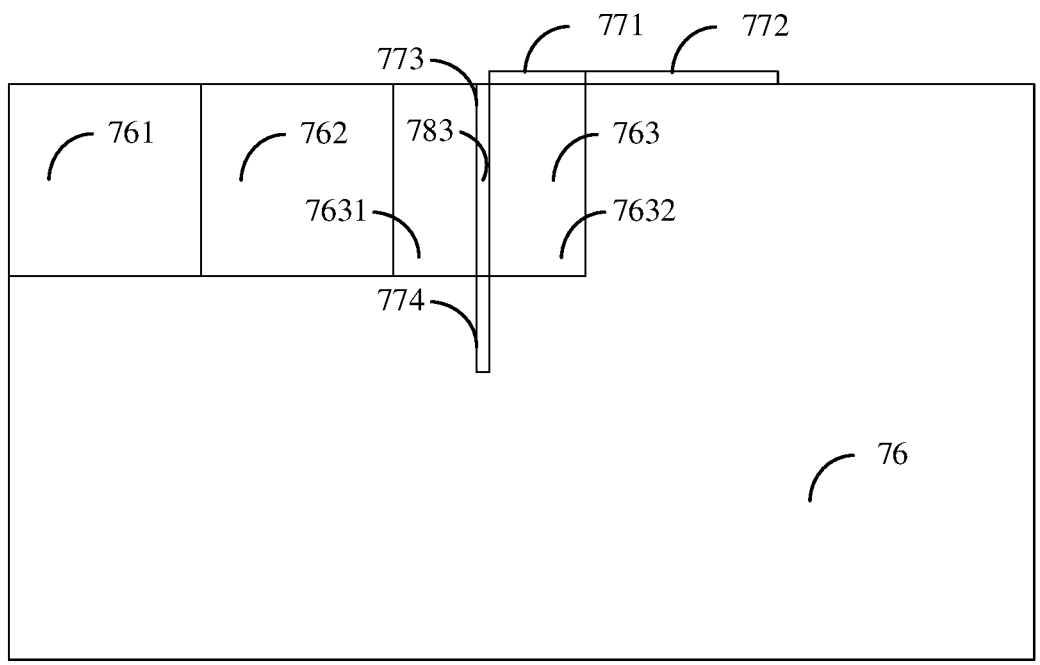

FIG. 7B is a schematic illustration of one exemplary implementation of the sub-block unit 7632 and the reference samples 782. In at least one implementation, the image frame 76 includes a fifth block unit 761, a sixth block unit 762, and a seventh block unit 763, and the seventh block unit 763 further includes a third sub-block unit 7631 and a fourth sub-block unit 7632. When the decoder module 222 reconstructs the fourth sub-block unit 7632, the intra prediction unit 22221 may determine a fifth sample position 771, a sixth sample position 772, a seventh sample position 773, and an eighth sample position 774 for the fourth sub-block unit 7632. In the implementation, the fifth sample position 771 may be an Above position, the sixth sample position 772 may be an AboveRight position, the seventh sample position 773 may be a Left position, and the eighth sample position 774 may be a BelowLeft position. In the implementation, there is no reference samples at the fifth sample position 771 and the sixth sample position 772, since there is no block unit located above the fourth sub-block unit 7632. In the implementation, the third sub-block unit 7631 may be reconstructed prior to reconstructing the fourth sub-block unit 7632, so the seventh sample position 773 may include the fourth reference samples 783 for reconstructing the block unit. In at least one implementation, the fourth sub-block unit 7632 may be reconstructed prior to reconstructing another block unit located below the block unit 763, so there is no reference sample at the eighth sample position 774 for reconstructing the second sub-block unit 7112.

At block 6332, the intra prediction unit 22221 determines the selected candidate list based on relationships between the reference samples and the sample positions.

In at least one implementation, there may be more than one candidate list predefined in the source device 11 and the destination device 12. In addition, a predefined selection rule for determining how to select one of the candidate lists may also be predefined in the source device 11 and the destination device 12. For example, the predefined candidate lists may include a first candidate list, a second candidate list, a third candidate list, and a fourth candidate list. In the implementation, each of the first to fourth candidate lists is different from each other. In the implementation, some of the candidate modes in one of the candidate lists may be identical to the candidate modes in the other candidate lists. In one implementation, the first candidate list may be selected, when there are reference samples at each of the first to fourth sample positions for the block unit. In another implementation, the second candidate list may be selected, when there are reference samples at the first to third sample positions for the block unit. In other words, there is no reference sample at the BelowLeft position. In addition, the third candidate list may be selected, when there is no reference sample at the AboveRight position. In other implementations, the fourth candidate list may be selected, when there are reference samples at the first sample position and the third to fourth sample positions for the block unit. In other words, there is no reference sample at the AboveRight position. For example, the intra prediction unit 22221 may determine that there is no reference sample at the second sample position 722. Thus, the intra prediction unit 22221 may select the third candidate list for reconstructing the second sub-block unit 7112 based on the predefined selection rule.

Figure 6B:
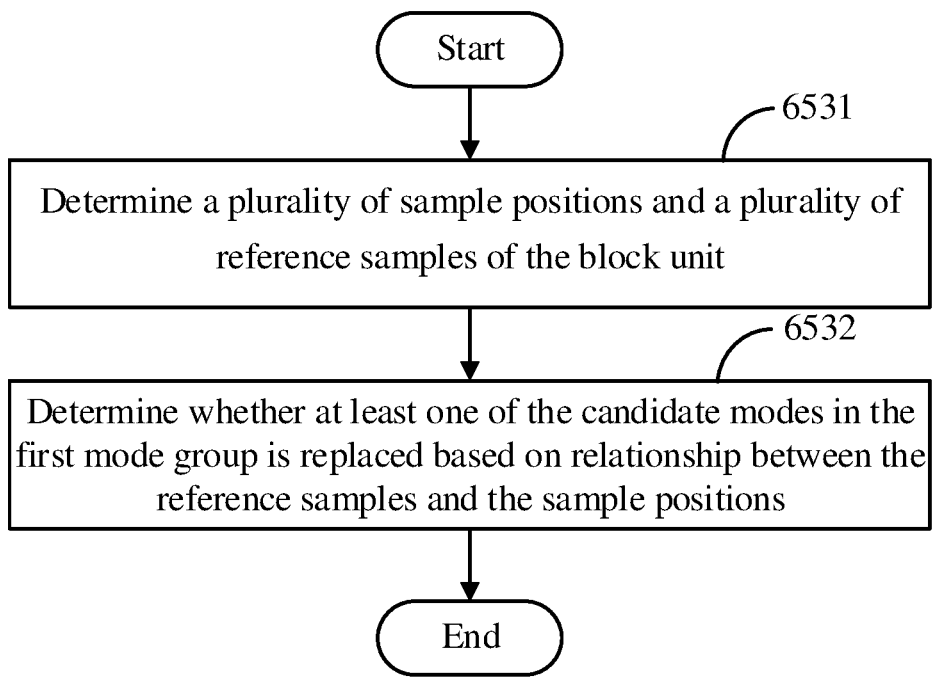

FIG. 6B illustrates a flowchart in accordance with a fourth exemplary implementation of the mode list adjustment for intra prediction. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 6B represents one or more processes, methods, or subroutines, carried out in the example method. Furthermore, the order of blocks is illustrative only and may change. Additional blocks may be added or less blocks may be utilized without departing from this disclosure. In one implementation, FIG. 6B may be a detailed exemplary implementation of block 53 in FIG. 5.

At block 6531, the intra prediction unit 22221 determines a plurality of sample positions and a plurality of reference samples of the block unit.

In at least one implementation, the intra prediction unit 22221 may determine a first sample position, a second sample position, a third sample position, and a fourth sample position for the block unit, when the decoder module 222 reconstructs the block unit. In the implementation, the first sample position may be an Above position, the second sample position may be an AboveRight position, the third sample position may be a Left position, and the fourth sample position may be a BelowLeft position. In one implementation, a first neighboring block covering the first sample position may be reconstructed prior to reconstructing the block unit. Thus, the first sample position may include a plurality of first reference samples generated based on the first neighboring block for the block unit. In another implementation, the block unit may be reconstructed prior to reconstructing a second neighboring block covering the second sample position. Thus, there may be no reference sample at the second sample position for reconstructing the block unit. In another implementation, there may be no reference sample at the third sample position and the fourth sample position, when there is no block unit located in the left of the block unit.

At block 6532, the intra prediction unit 22221 determines whether at least one of the candidate modes in the first mode group is replaced based on relationships between the reference samples and the sample positions.

In at least one implementation, the candidate modes in the mode list may be predefined in the destination device 12 and the source device 11, and divided into the first mode group and the second mode group. In the implementation, the candidate modes in the first mode group predefined in the source device 11 are identical to the candidate modes in the first mode group predefined in the destination device 12. In the implementation, the candidate modes in the second mode group predefined in the source device 11 are identical to the candidate modes in the second mode group predefined in the destination device 12. In the implementation, the candidate modes in the first mode group may be a plurality of default modes selected from the mode list, and the candidate modes in the second mode group may be a plurality of added modes selected from the mode list for replacing at least one of the default modes. In at least one implementation, the default modes in the first mode group may include a planar mode, a DC mode, and a plurality of first directional modes, and the added modes in the second mode group may include a plurality of second directional modes. In the implementation, the at least one of the second directional modes may be selected to replace the at least one of the first directional modes. In the implementation, each of the candidate modes in the second mode group is different from the candidate modes in the first mode group.

In at least one implementation, a predefined replacement rule for determining whether the at least one of the default mode is replaced may be predefined in the source device 11 and the destination device 12. In one implementation, each of the default modes may remain unchanged, when there are reference samples at each of the first to fourth sample positions for the block unit. Thus, the block unit may be predicted by one of the default modes. In another implementation, the at least one of the default modes may be replaced by the at least one of the added modes, when there is no reference sample at one of the first to fourth sample positions for the block unit.

In at least one implementation, the default modes in the first mode group may remain unchanged, when the intra prediction unit 22221 determines that there are reconstructed samples at the BelowLeft position and the AboveRight position. In the implementation, the intra prediction unit 22221 replaces the at least one of the default modes having orientations directing toward the AboveRight position by the at least one of the added modes, when the intra prediction unit 22221 determines that there are reconstructed samples at the BelowLeft position and that there is no reconstructed sample at the AboveRight position. In the implementation, the at least one of the added modes may be selected from a plurality of outermost candidate modes in the second mode group, such as the candidate modes directing toward the BelowLeft position. In the implementation, the intra prediction unit 22221 replaces the at least one of the default modes having orientations directing toward the BelowLeft position by the at least one of the added modes, when the intra prediction unit 22221 determines that there are reconstructed samples at the AboveRight position and that there is no reconstructed sample at the BelowLeft position. In the implementation, the at least one of the added modes may be selected from the outermost candidate modes, such as the candidate modes directing toward the AboveRight position. In the implementation, the default modes in the first mode group may remain unchanged, when the intra prediction unit 22221 determines that there is no reconstructed sample at the AboveRight position and the BelowLeft position.

In at least one implementation, the intra prediction unit 22221 may replace at least one of the default modes having orientations directing toward the BelowLeft position and the AboveRight position by the at least one of the added modes, when the intra prediction unit 22221 determines that there is no reconstructed sample at the BelowLeft position and the AboveRight position. In the implementation, the at least one of the added modes may be selected based on a cost function. In the implementation, the cost function may be the sum of absolute differences (SAD). In at least one implementation, the intra prediction unit 22221 may replace at least one of the default modes by the at least one of the added modes, when the intra prediction unit 22221 determines that there are reconstructed samples at each of the four sample positions. In the implementation, the at least one of the added modes and the at least one of the default modes may be selected based on the cost function.

In at least one implementation, the intra prediction unit 22221 may generate an intra predictor based on each of the added modes, and calculate the cost function for each of the added modes. Then, the intra prediction unit 22221 may select at least one of the added modes having the lowest cost results to replace the at least one of the default modes. In at least one implementation, in FIG. 7A, the intra prediction unit 22221 may determine four sample positions 721, 722, 723, and 724, and determine that there are reconstructed samples 731, 733, and 734 at the sample positions 721, 723, and 724. Thus, the intra prediction unit 22221 may determine that there is no reconstructed sample at the second sample position 722, i.e. the AboveRight position. In the implementation, the intra prediction unit 22221 may select at least one of the candidate modes in the second mode group having the lowest cost results, or directing toward the BelowLeft position. Then, the intra prediction unit 22221 may replace the at least one candidate modes in the first mode group by the selected at least one candidate modes in the second mode group. Thus, the intra prediction unit 22221 may compare the at least one of the candidate modes in the first mode group with a specific one of the candidate modes in the first mode group determined based on an orientation flag to determine whether the specific candidate mode in the first mode group is replaced or not.

Figure 8A:
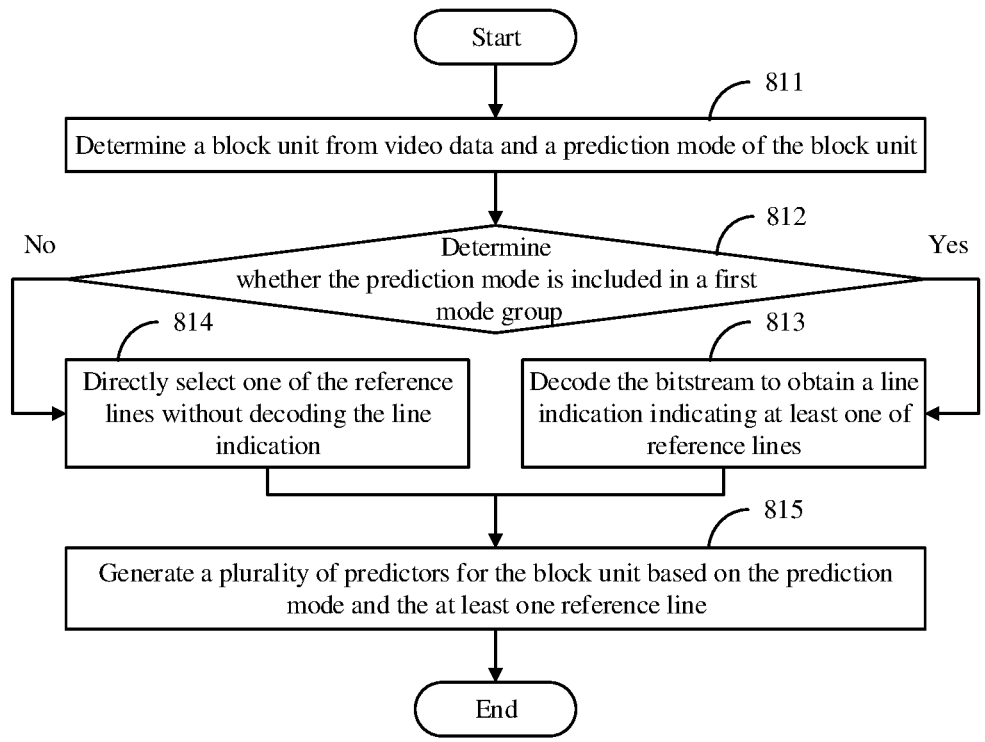
FIGS. 8A and 8B illustrate two flowcharts in accordance with a first exemplary implementation and a second exemplary implementation, respectively, of the multi-reference line prediction for chroma prediction.

FIG. 8A illustrates a flowchart in accordance with a first exemplary implementation of the multi-reference line prediction for chroma prediction. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 8A represents one or more processes, methods, or subroutines, carried out in the example method. Furthermore, the order of blocks is illustrative only and may change. Additional blocks may be added or less blocks may be utilized without departing from this disclosure.

At block 811, the decoder module 222 determines a block unit from the video data, and a prediction mode of the block unit.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indications in the bitstream. For example, the decoder module 222 may divide the image frames to generate a plurality of coding tree units, and further divide one of the coding tree units to determine the block unit having a block size according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices. In the implementation, the prediction indications include at least one mode flag indicating that the block unis is predicted based on the prediction mode.

Figure 9:
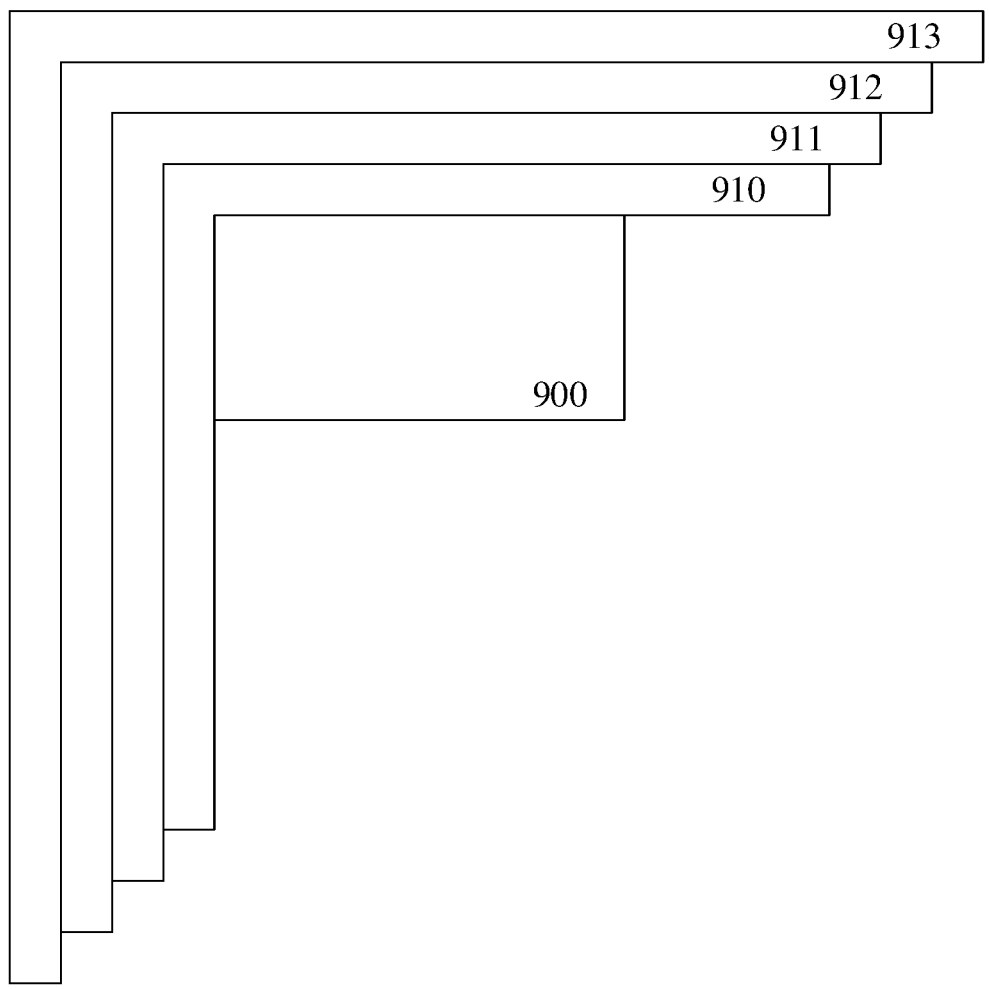
FIG. 9 is a schematic illustration of one exemplary implementation of the block unit and a plurality of reference lines.

In at least one implementation, the intra prediction unit 22221 determines a plurality of reconstructed samples neighboring with the block unit. FIG. 9 is a schematic illustration of one exemplary implementation of the block unit 900 and a plurality of reference lines 910, 911, 912, and 913 each having a plurality of reconstructed samples. In the implementation, the number of the reference lines may be equal to L, and the number L may be an integer greater than one. In one implementation, the intra prediction unit 22221 selects at least one of the reference lines to reconstruct the block unit based on the selected at least one of the reference lines according to the prediction mode.

In at least one implementation, the prediction mode is selected from a plurality of candidate modes. In at least one implementation, the candidate modes may include a plurality of direct modes (DMs), a plurality of most probable modes (MPMs) and a plurality of linear modes (LMs). In the implementation, the LMs may include a linear model mode, a multiple-model linear mode (MMLM), and a multiple-filter linear mode (MFLM). In one implementation, the intra prediction unit 22221 may reconstruct the block unit 900 based on the reconstructed samples in one of the reference lines 910-913, when the intra prediction unit determines that the prediction mode is selected from the LMs based on the at least one prediction flag. In the implementation, the one of the reference lines may be predefined as a first one of the reference lines. For example, the predefined one of the reference lines may be the first reference line 910 in FIG. 9. In one implementation, the intra prediction unit 22221 may reconstruct the block unit based on the reconstructed samples in at least one of the reference lines, when the intra prediction unit 22221 determines that the prediction mode is selected from the DMs and MPMs based on the at least one prediction flag. In the implementation, in FIG. 9, the intra prediction unit 22221 may select at least one of the reference lines 910-913 to reconstruct the block unit 900 based on the selected at least one of the reference lines 910-913 according to the prediction mode.

At block 812, the decoder module 222 determines whether the prediction mode is included in a first mode group. When the prediction mode is included in the first mode group, the procedure proceeds to block 813. When the prediction mode is different from the candidate modes in the first mode group, the procedure directly proceeds to block 814.

In at least one implementation, the source device 11 and the destination device 12 may separate the candidate modes into a plurality of mode groups. In the implementation, the first mode group may include a plurality of first candidate modes, and a second mode group may include a plurality of second candidate modes. In one implementation, the encoder module 112 may predict the block unit based on the reconstructed samples in the at least one of the reference lines, when the encoder module 112 determines to predict the block unit based on a specific one of the first candidate modes. In addition, the decoder module 222 may reconstruct the block unit based on the reconstructed samples in the at least one of the reference lines, when the decoder module 222 determines to reconstruct the block unit based on the specific first candidate mode. In one implementation, the encoder module 112 may predict the block unit based on the reconstructed samples in the predefined one of the reference lines, when the encoder module 112 determines to predict the block unit based on a specific one of the second candidate modes. In addition, the decoder module 222 may reconstruct the block unit based on the reconstructed samples in the predefined one of the reference lines, when the decoder module 222 determines to reconstruct the block unit based on the specific second candidate mode. In one implementation, the first candidate modes may be the DMs, and the MPMs, and the second candidate modes may be the LMs.

In at least one implementation, the intra prediction unit 22221 may reconstruct the block unit based on the reconstructed samples in the at least one of the reference lines, when the intra prediction unit 22221 determines that the prediction mode belongs to the first mode group having the DMs and MPMs. Thus, the decoder module 222 needs to further determine which of the reference lines is used to predict the block unit.

In at least one implementation, the intra prediction unit 22221 may reconstruct the block unit based on the reconstructed samples in the predefined one of the reference lines, when the intra prediction unit determines that the prediction mode is included in the second mode group having the LMs. Thus, the intra prediction unit 22221 may directly select the predefined one of the reference lines to reconstruct the block unit without decoding a line indication indicating an index corresponding to the at least one of the reference lines.

At block 813, the decoder module 222 decodes the bitstream to obtain the line indication indicating the at least one of the reference lines.

In at least one implementation, the intra prediction unit 22221 may reconstruct the block unit based on the reconstructed samples in the at least one of the reference lines, when the intra prediction unit 22221 determines that the prediction mode belongs to the first mode group. In one implementation, the decoder module 222 decodes the bitstream to obtain the line indication. In the implementation, the line indication may be a line index. In the implementation, the intra prediction unit 22221 may determine the at least one of the reference lines based on the line index. For example, the number of the at least one reference lines may equal to one, when the line index is equal to zero. In one implementation, the at least one reference lines may be the first reference line, when the line index is equal to zero. In another implementation, the at least one reference lines may be the second reference line or a combination of the first reference line and the second reference line, when the line index is equal to one.

At block 814, the decoder module 222 directly selects one of the reference lines without further decoding the line indication.

In at least one implementation, the intra prediction unit 22221 may reconstruct the block unit based on the reconstructed samples in the predefined one of the reference lines, when the intra prediction unit determines that the prediction mode is different from the first candidate modes in the first mode group. In one implementation, the predefined one of the reference lines may be the first reference line.

At block 815, the decoder module 222 generates a plurality of predictors in the block unit based on the prediction mode and the at least one reference line.

In at least one implementation, the block unit may include a plurality of block elements. In the implementation, each of the block elements may be a pixel element. In at least one implementation, the intra prediction unit 22221 may determine, according to the prediction mode derived for the block unit, one of the predictors for each of the block elements based on the reference samples in the at least one reference line.

In at least one implementation, the first summer 2224 of the decoder module 222 in the destination device 12 may add the predictors derived based on the prediction mode into a plurality of residual samples determined from the bitstream to reconstruct the block unit. In addition, the decoder module 222 may reconstruct all of the other block units in the image frame for reconstructing the image frame and the video.

Figure 8B:
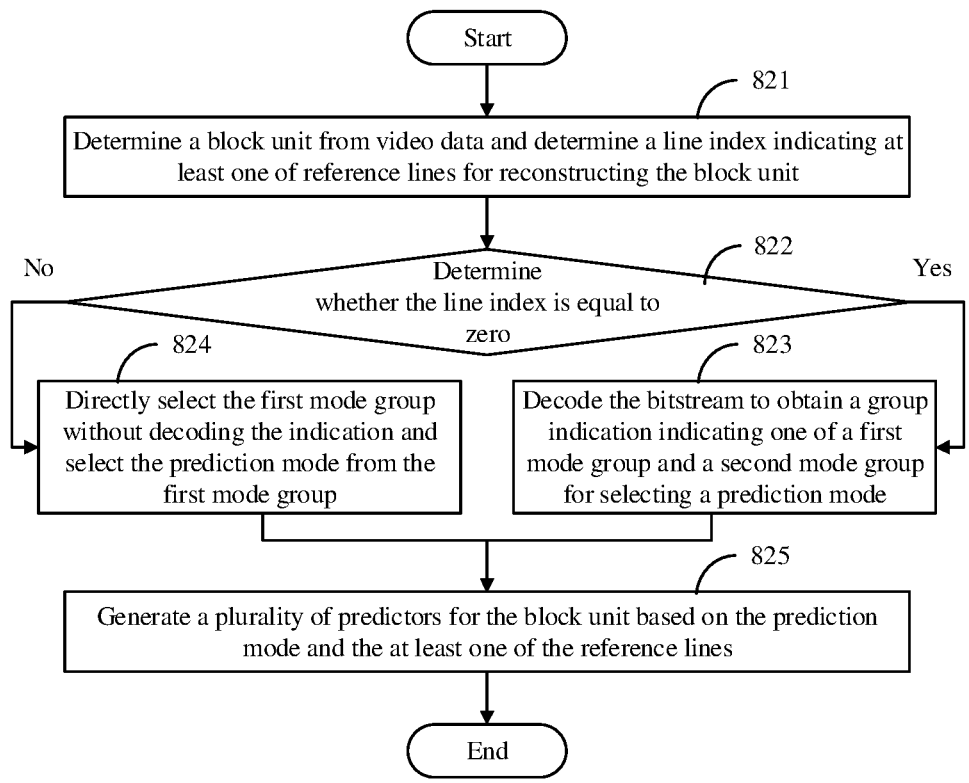

FIG. 8B illustrates a flowchart in accordance with a second exemplary implementation of the multi-reference line prediction for chroma prediction. The example method is provided by way of example only, as there are a variety of ways to carry out the method. The method described below may be carried out using the configurations illustrated in FIG. 1 and FIG. 2, for example, and various elements of these figures are referenced in explaining the example method. Each block shown in FIG. 8B represents one or more processes, methods, or subroutines, carried out in the example method. Furthermore, the order of blocks is illustrative only and may change. Additional blocks may be added or less blocks may be utilized without departing from this disclosure.

At block 821, the decoder module 222 determines a block unit from video data and determines a line index indicating at least one of reference lines for reconstructing the block unit.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indications in the bitstream. For example, the decoder module 222 may divide the image frames to generate a plurality of coding tree units, and further divide one of the coding tree units to determine the block unit having a block size according to the partition indications based on any video coding standard.

In at least one implementation, the intra prediction unit 22221 may determine a plurality of reconstructed samples in the reference lines. In one implementation, the number of the reference lines may be equal to L, and the number L may be an integer greater than one. In one implementation, the intra prediction unit 22221 may select the indicated at least one of the reference lines for reconstructing the block unit.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices. In the implementation, the prediction indications include the line index indicating which of the reference lines is the indicated at least one of the reference lines.

At block 822, the decoder module 222 determines whether the line index is equal to zero. When the line index is equal to zero, the procedure proceeds to block 823. When the line index is different from zero, the procedure proceeds to block 824.

In at least one implementation, the prediction indications may include a mode flag indicating that the block unit is predicted based on a prediction mode. In at least one implementation, the prediction mode is selected from a plurality of candidate modes. In at least one implementation, the candidate modes may include a plurality of direct modes (DMs), a plurality of most probable modes (MPMs) and a plurality of linear modes (LMs). In the implementation, the LMs may include a linear model mode, a multiple-model linear mode (MMLM), and a multiple-filter linear mode (MFLM).

In at least one implementation, the source device 11 and the destination device 12 may separate the candidate modes into a plurality of mode groups. In the implementation, the first mode group may include a plurality of first candidate modes, and a second mode group may include a plurality of second candidate modes. In one implementation, the first candidate modes may be the DMs, and the MPMs, and the second candidate modes may be the LMs.

In one implementation, the encoder module 112 may predict the block unit based on the reconstructed samples in the indicated at least one of the reference lines, when the encoder module 112 determines to predict the block unit based on a specific one of the first candidate modes. In addition, the decoder module 222 may reconstruct the block unit based on the reconstructed samples in the indicated at least one of the reference lines, when the decoder module 222 determines to reconstruct the block unit based on the specific first candidate mode. In the implementation, in FIG. 9, the intra prediction unit 22221 may select at least one of the reference lines 910-913 to reconstruct the block unit 900 based on the line index indicating the selected at least one of the reference lines 910-913. For example, the indicated at least one of the reference lines 910-913 may be the first reference line 910, when the line index is equal to zero. In another implementation, the indicated at least one reference lines may be the second reference line 911 or a combination of the first reference line 910 and the second reference line 911, when the line index is equal to one.

In one implementation, the encoder module 112 may predict the block unit based on the reconstructed samples in the predefined one of the reference lines, when the encoder module 112 determines to predict the block unit based on a specific one of the second candidate modes. In addition, the decoder module 222 may reconstruct the block unit based on the reconstructed samples in the predefined one of the reference lines, when the decoder module 222 determines to reconstruct the block unit based on the specific second candidate mode. In one implementation, the predefined one of the reference lines may be the first reference line, and the line index is predefined to be equal to zero.

In at least one implementation, the prediction mode may be selected from the first mode group and the second mode group, when the line index is equal to zero. Thus, the intra prediction unit 22221 needs to further select one of the first mode group and the second mode group to determine the prediction mode. In another implementation, the prediction mode may be selected only from the first mode group, when the line index is different from zero.

At block 823, the decoder module 222 decodes the bitstream to obtain a group indication indicating one of the first mode group and the second mode group for selecting the prediction mode.

In at least one implementation, the prediction mode may be selected from the first mode group and the second mode group, when the line index is equal to zero. Thus, the intra prediction unit 22221 may need the group indication to select one of the first mode group and the second mode group, when the line index is equal to zero. When the group indication indicates that the prediction mode is selected from the first mode group, the intra prediction unit 22221 may further determine the prediction mode from the first mode group based on a first mode flag. When the group indication indicates that the prediction mode is selected from the second mode group, the intra prediction unit 22221 may further determine the prediction mode from the second mode group based on a second mode flag. In one implementation, the intra prediction unit 222221 may directly set the first candidate mode as the prediction mode without decoding the first mode flag, when the first mode group only includes one first candidate mode. In addition, the intra prediction unit 22221 may directly set the second candidate mode as the prediction mode without decoding the second mode flag, when the second mode group only includes one second candidate mode.

At block 824, the decoder module 222 directly selects the first mode group without decoding the group indication and selects the prediction mode from the first mode group.

In at least one implementation, the prediction mode may be selected only from the first mode group, when the line index is different from zero. Thus, the intra prediction unit 22221 do not need the group indication, when the line index is different from zero. In one implementation, the intra prediction unit 22221 may further determine the prediction mode from the first candidate modes in the first mode group based on the first mode flag. In another implementation, the intra prediction unit 222221 may directly set the first candidate mode as the prediction mode without decoding the first mode flag, when the first mode group only includes one first candidate mode.

At block 825, the intra prediction unit 22221 generates a plurality of predictors in the block unit based on the prediction mode and the at least one of the reference lines.

In at least one implementation, the block unit may include a plurality of block elements. In the implementation, each of the block elements may be a pixel element. In at least one implementation, the intra prediction unit 22221 may determine, according to the prediction mode derived for the block unit, one of the predictors for each of the block elements based on the reference samples in the at least one reference line.

In at least one implementation, the first summer 2224 of the decoder module 222 in the destination device 12 may add the predictors derived based on the prediction mode into a plurality of residual samples determined from the bitstream to reconstruct the block unit. In addition, the decoder module 222 may reconstruct all of the other block units in the image frame for reconstructing the image frame and the video.

Figure 10:
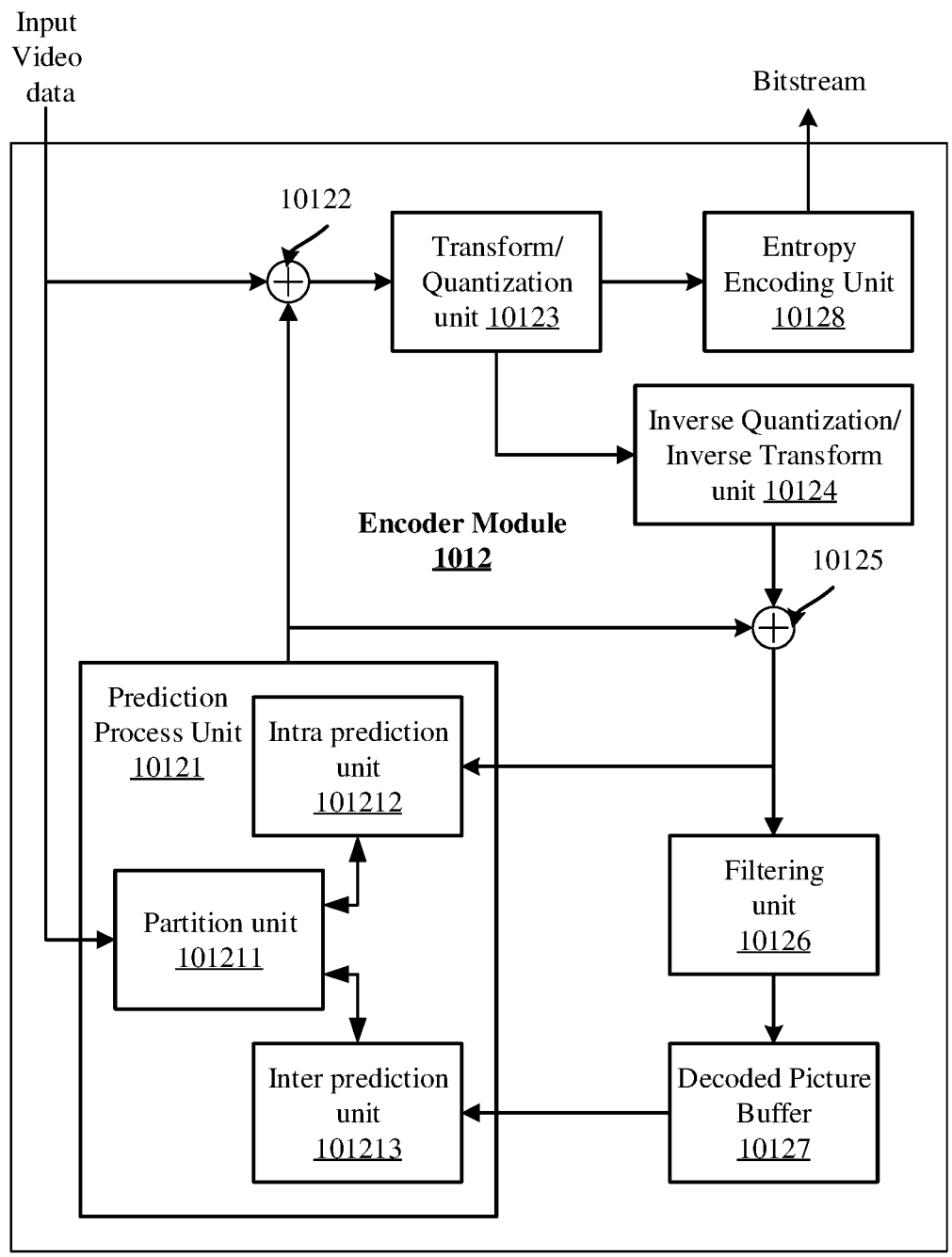
FIG. 10 is a block diagram of an exemplary implementation of the encoder module of the source device in the system of FIG. 1.

FIG. 10 is a block diagram of an encoder module 1012 representing an exemplary implementation of the encoder module 1012 of the source device 11 in the system of FIG. 1. In at least one implementation, the encoder module 1012 includes a prediction process unit 10121, a first summer 10122, a transform/quantization unit 10123, an inverse quantization/inverse transform unit 10124, a second summer 10125, a filtering unit 10126, a decoded picture buffer 10127, and an entropy encoding unit 10128. In at least one implementation, the prediction process unit 10121 of the encoder module 1012 further includes a partition unit 101211, an intra prediction unit 101212, and an inter prediction unit 101213. In at least one implementation, the encoder module 1012 receives the source video, and encodes the source video to output a bitstream.

In at least one implementation, the encoder module 1012 may receive a source video including a plurality of image frames, and then divide the image frames according to a coding structure. In at least one implementation, each of the image frames may be divided into at least one image block. The at least one image block may include a luminance block having a plurality of luminance samples, and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit. In at least one implementation, the encoder module 1012 may perform additional sub-divisions of the source video. It should be noted that the disclosure described herein are generally applicable to video coding, regardless of how the source video is partitioned prior to and/or during encoding.

In at least one implementation, during the encoding process, the prediction process unit 10121 receives a current image block of a specific one of the image frames. The current image block may be one of the luminance block and the at least one of the chrominance block in the specific image frame. The partition unit 101211 divides the current image block into multiple block units. The intra prediction unit 101212 may perform intra-predictive coding of a current block unit relative to one or more neighboring blocks in the same frame as the current block unit to provide spatial prediction. The inter prediction unit 101213 may perform inter-predictive coding of the current block unit relative to one or more blocks in one or more reference image block to provide temporal prediction.

In at least one implementation, the prediction process unit 10121 may select one of the coding results generated by the intra prediction unit 101212 and the inter prediction unit 101213 based on a mode selection method, such as a cost function. In at least one implementation, the mode selection method may be a rate-distortion optimization (RDO) process. The prediction process unit 10121 determines the selected coding result, and provides a predicted block corresponding to the selected coding result to the first summer 10122 for generating a residual block and to the second summer 10125 for reconstructing the encoded block unit. In at least one implementation, the prediction process unit 10121 may further provide syntax elements, such as motion vectors, intra-mode indicators, partition information, and other syntax information, to the entropy encoding unit 10128.

In at least one implementation, the intra prediction unit 101212 may intra-predict the current block unit. In at least one implementation, the intra prediction unit 101212 may determine an intra-prediction mode directing toward reconstructed sample neighboring to the current block unit to encode the current block unit. In at least one implementation, the intra prediction unit 101212 may encode the current block unit using various intra-prediction modes, and the intra prediction unit 101212 or the prediction process unit 10121 may select an appropriate intra-prediction mode from the tested modes. In at least one implementation, the intra prediction unit 101212 may encode the current block unit using a cross component prediction mode to predict one of the two chroma components of the current block unit based on the luma components of the current block unit. In addition, the intra prediction unit 101212 may predict a first one of the two chroma components of the current block unit based on the other of the two chroma components of the current block unit.

In at least one implementation, the inter prediction unit 101213 may inter-predict the current block unit as an alternative to the intra-prediction performed by the intra prediction unit 101212, as described above. The inter prediction unit 101213 may perform a motion estimation to estimate a motion of the current block unit for generating a motion vector. The motion vector may indicate a displacement of the current block unit within the current image block relative to a reference block unit within a reference image block. In at least one implementation, the inter prediction unit 101213 receives at least one reference image block stored in the decoded picture buffer 10127 and estimates the motion based on the received reference image blocks to generate the motion vector.

In at least one implementation, the first summer 10122 generates the residual block by subtracting the prediction block determined by the prediction process unit 10121 from the original current block unit. The first summer 10122 represents the component or components that perform this subtraction operation.

In at least one implementation, the transform/quantization unit 10123 applies a transform to the residual block to generate a residual transform coefficient, and then quantizes the residual transform coefficients to further reduce bit rate. In at least one implementation, the transform may be DCT, DST, AMT, MDNSST, HyGT, signal dependent transform, KLT, wavelet transform, integer transform, sub-band transform or a conceptually similar transform. In at least one implementation, the transform may convert the residual information from a pixel value domain to a transform domain, such as a frequency domain. In at least one implementation, the degree of quantization may be modified by adjusting a quantization parameter. In at least one implementation, the transform/quantization unit 10123 may perform a scan of the matrix including the quantized transform coefficients. Alternatively, the entropy encoding unit 10128 may perform the scan.

In at least one implementation, the entropy encoding unit 10128 may receive a plurality of syntax elements including quantization parameter, transform data, motion vectors, intra modes, partition information, and other syntax information, from the prediction process unit 10121, and the transform/quantization unit 10123, and encode encodes the syntax elements into the bitstream. In at least one implementation, the entropy encoding unit 10128 entropy encodes the quantized transform coefficients. In at least one implementation, the entropy encoding unit 10128 may perform CAVLC, CABAC, SBAC, PIPE coding or another entropy coding technique to generate an encoded bitstream. In at least one implementation, the encoded bitstream may be transmitted to another device (e.g., the destination device 12) or archived for later transmission or retrieval.

In at least one implementation, the inverse quantization/inverse transform unit 10124 may apply inverse quantization and inverse transformation to reconstruct the residual block in the pixel domain for later use as a reference block. In at least one implementation, the second summer 10125 adds the reconstructed residual block to the prediction block provided from the prediction process unit 10121 to produce a reconstructed block for storage in the decoded picture buffer 10127.

In at least one implementation, the filtering unit 10126 may include a deblocking filter, a SAO filter, a bilateral filter, and/or an ALF to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the second summer 10125.

In at least one implementation, the decoded picture buffer 10127 may be a reference picture memory that stores the reference block for use in encoding video by the encoder module 1012, e.g., in intra- or inter-coding modes. The decoded picture buffer 10127 may be formed by any of a variety of memory devices, such as DRAM, including SDRAM, MRAM, RRAM), or other types of memory devices. In at least one implementation, the decoded picture buffer 10127 may be on-chip with other components of the encoder module 1012, or off-chip relative to those components.

In at least one implementation, the encoder module 1012 may perform the mode list adjustment method for intra prediction as shown in FIG. 3. The method in FIG. 3 may be carried out using the configurations illustrated in FIG. 1 and FIG. 10, for example, and various elements of these figures are referenced in explaining the example method. Furthermore, the order of blocks in FIG. 3 is illustrative only and may change. Additional blocks may be added or less blocks may be utilized without departing from this disclosure.

At block 31, the encoder module 1012 determines a block unit in an image frame from video data, and determines a plurality of neighboring blocks neighboring with the block unit.

In at least one implementation, the video data may be a video. The source device 11 may receive the video by the source module 111. The encoder module 1012 determines the image frame from the video, and divides the image frame to determine the block unit.

In at least one implementation, the prediction process unit 10121 of the source device 11 determines the block unit from the video via the partition unit 101211, and then the encoder module 1012 provides a plurality of partition indications into a bitstream based on a partition result of the partition unit 101211. In at least one implementation, the prediction process unit 10121 determines the neighboring blocks neighboring with the block unit. In at least one implementation, the neighboring blocks may be predicted prior to predicting the block unit, so the neighboring blocks may include a plurality of reference samples for predicting the block unit. In at least one implementation, the block unit may be predicted prior to predicting some of the neighboring blocks, so the unpredicted neighboring blocks may not include the reference samples for the block unit.

At block 32, the intra prediction unit 101212 determines a first mode list having a plurality of first candidate modes and a second mode list having a plurality of second candidate modes.

In at least one implementation, the first candidate modes and the second candidate modes are selected from a plurality of intra modes predefined in the source device 11 and the destination device 12. In one implementation, at least one of the first candidate modes may be identical to at least one of the second candidate modes. In another implementation, each of the first candidate modes may be different from the second candidate modes.

At block 33, the intra prediction unit 101212 selects one of the first mode list and the second mode list.

In at least one implementation, the intra prediction unit 101212 may determine, which one of the first mode list and the second mode list is selected for the block unit. In one implementation, the intra prediction unit 101212 may determine whether the neighboring blocks include the reference samples for determining how to select one of the first mode list and the second mode list. In another implementation, the intra prediction unit 101212 may determine how to select one of the first mode list and the second mode list based on a block size of the block unit 411.

At block 34, the intra prediction unit 101212 selects a prediction mode from the selected mode list.

In at least one implementation, the prediction process unit 10121 may select one of coding results generated according to the selected one of the first mode list and the second mode list by the intra prediction unit 101212 based on a mode selection method, such as a cost function. In at least one implementation, the mode selection method may be a rate-distortion optimization (RDO) process. When the selected one of the first mode list and the second mode list is the first mode list, the prediction process unit 10121 may select one of the first candidate modes, and set the selected one of the first candidate modes as the prediction mode.

At block 35, the intra prediction unit 101212 generates a plurality of reconstructed components in the block unit based on the neighboring blocks and the prediction mode.

In at least one implementation, the block unit may include a plurality of block elements. In the implementation, each of the block elements may be a pixel element. In at least one implementation, the intra prediction unit 101212 may determine the predictors based on the selected coding result for each of the block elements. In the implementation, the encoder module 1012 predicts the block unit to generate a plurality of residual samples based on the predictors, and provide the bitstream including a plurality of coefficients corresponding to the residual samples. In addition, the encoder module 1012 may return the residual samples based on the coefficients, and add the returned residual samples into the predictors to generate the reconstructed components.

Figure 11:
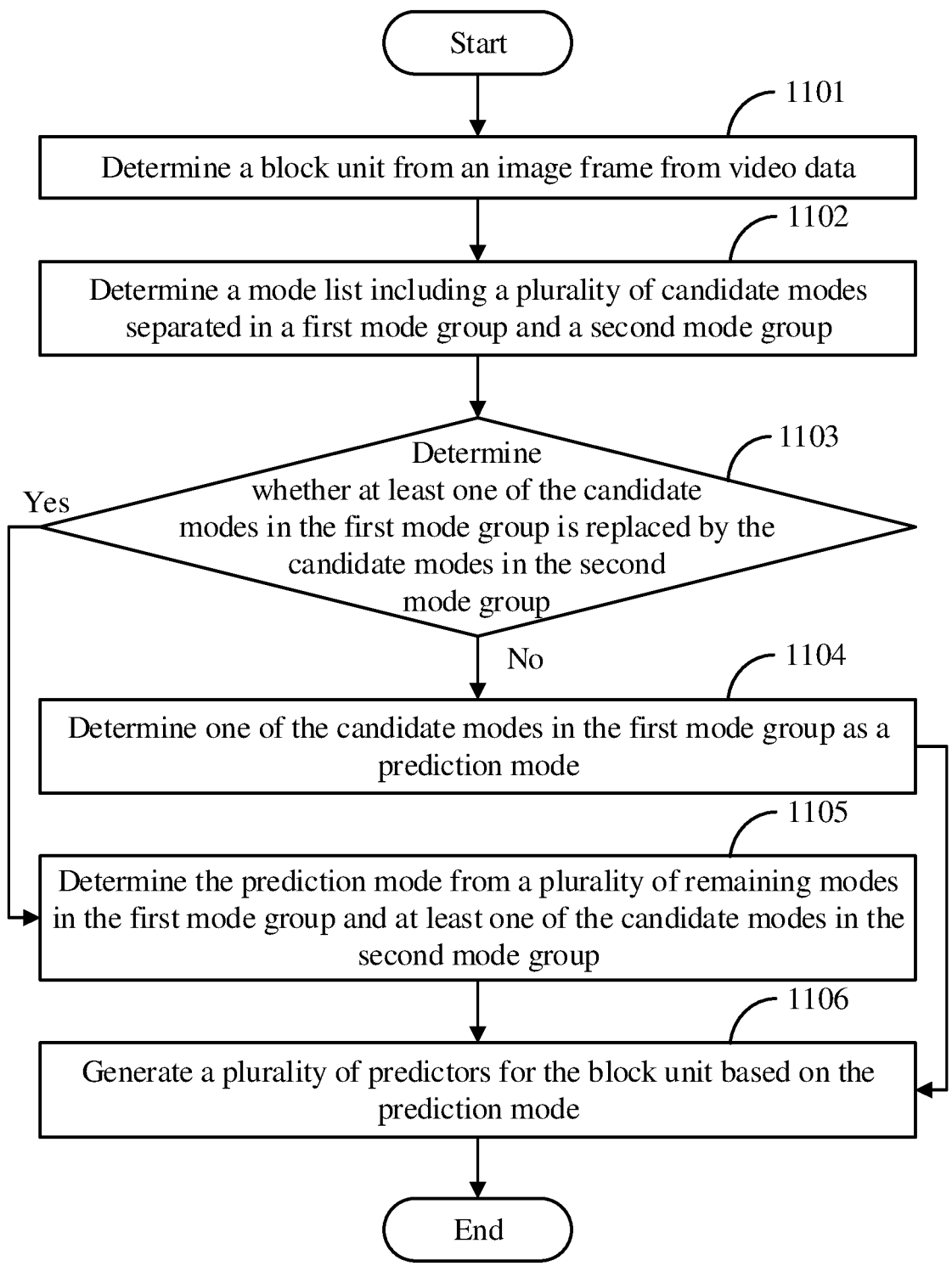
FIG. 11 illustrates a flowchart in accordance with a fifth exemplary implementation of the mode list adjustment for intra prediction.

FIG. 11 illustrates a flowchart in accordance with a fifth exemplary implementation of the mode list adjustment for intra prediction. The example method is provided by way of example only, as there are a variety of ways to carry out the method. The method described below may be carried out using the configurations illustrated in FIG. 1 and FIG. 10, for example, and various elements of these figures are referenced in explaining the example method. Each block shown in FIG. 11 represents one or more processes, methods, or subroutines, carried out in the example method. Furthermore, the order of blocks is illustrative only and may change. Additional blocks may be added or less blocks may be utilized without departing from this disclosure.

At block 1101, the encoder module 1012 determines a block unit in an image frame from video data.

In at least one implementation, the video data may be a video. The source device 11 may receive the video by the source module 111. The encoder module 1012 determines the image frame from the video, and divides the image frame to determine the block unit.

In at least one implementation, the prediction process unit 10121 of the source device 11 determines the block unit from the video via the partition unit 101211, and then the encoder module 1012 provides a plurality of partition indications into a bitstream based on a partition result of the partition unit 101211.

In at least one implementation, the prediction process unit 10121 of the destination device 12 determines the neighboring blocks neighboring with the block unit. In at least one implementation, the neighboring blocks may be predicted prior to predicting the block unit, so the neighboring blocks may include a plurality of reference samples for predicting the block unit. In at least one implementation, the block unit may be predicted prior to predicting some of the neighboring blocks, so the unpredicted neighboring blocks may not include the reference samples for the block unit.

At block 1102, the intra prediction unit 101212 determines a mode list including a plurality of candidate modes separated into a first mode group and a second mode group.

In at least one implementation, the candidate modes in the mode list may be predefined in the destination device 12 and the source device 11. For example, the candidate modes may be predefined as a planar mode, a DC mode, and/or a plurality of directional modes. In at least one implementation, the intra prediction unit 101212 may divide the candidate modes into a first mode group and a second mode group. In the implementation, the candidate modes in the first mode group may be a plurality of default modes selected from the mode list, and the candidate modes in the second mode group may be a plurality of added modes selected from the mode list for replacing at least one of the default modes. In at least one implementation, the default modes in the first mode group may include a planar mode, a DC mode, and a plurality of first directional modes, and the added modes in the second mode group may include a plurality of second directional modes. In the implementation, the second directional modes may be selected for replacing at least one of the first directional modes. In the implementation, each of the added modes in the second mode group is different from the default modes in the first mode group.

At block 1103, the intra prediction unit 101212 determines whether at least one of the candidate modes in the first mode group is replaced by the candidate modes in the second mode group.

In one implementation, the intra prediction unit 101212 may determine whether the neighboring blocks include the reference samples for determining whether to replace the at least one of the candidate modes in the first group by at least one of the candidate modes in the second mode group. In the implementation, the intra prediction unit 101212 may determine that the at least one of the candidate modes in the first mode group is replaced by the candidate modes in the second mode group according to relationships between the neighboring blocks and the reference samples. In the implementation, the relationships may include locations of the neighboring blocks including the reference samples and locations of the unpredicted neighboring blocks.

In at least one implementation, the intra prediction unit 101212 may determine based on a block size of the block unit whether to replace the at least one of the candidate modes in the first group by the candidate modes in the second mode group. When a block width is equal to a block height, the intra prediction unit 101212 may determine that the at least one of the candidate modes in the first group is not replaced by the candidate modes in the second mode group. When the block width is different from the block height, the intra prediction unit 101212 may determine that the at least one of the candidate modes in the first group is replaced by the candidate modes in the second mode group.

At block 1104, the intra prediction unit 101212 determines one of the candidate modes in the first mode group as a prediction mode.

In at least one implementation, the prediction process unit 10121 may select one of coding results generated according to the candidate modes in the first mode group by the intra prediction unit 101212 based on a mode selection method, such as a cost function. In at least one implementation, the mode selection method may be a rate-distortion optimization (RDO) process. In the implementation, a specific one of the candidate modes in the first mode group used to generate the selected one of the coding results may be set as the prediction mode by the intra prediction unit 101212.

At block 1105, the intra prediction unit 101212 determines the prediction mode from a plurality of remaining modes in the first mode group and the at least one of the candidate modes in the second mode group.

In at least one implementation, the prediction process unit 10121 may select one of coding results generated according to the remaining modes in the first mode group and the at least one of the candidate modes in the second mode group by the intra prediction unit 101212 based on a mode selection method, such as a cost function. In at least one implementation, the mode selection method may be a rate-distortion optimization (RDO) process. In the implementation, the at least one of the candidate modes in the first mode group is replaced by the at least one of the candidate modes in the second mode group, and the other of the candidate modes in the first mode group may be regarded as the remaining modes. In the implementation, the selected one of the coding results is generated based on the prediction mode selected from the remaining modes in the first mode group and the at least one of the candidate modes in the second mode group.

At block 1106, the encoder module 1012 generates a plurality of predictors in the block unit based on the prediction mode.

In at least one implementation, the block unit may include a plurality of block elements. In the implementation, each of the block elements may be a pixel element. In at least one implementation, the intra prediction unit 101212 may determine, along an orientation of the prediction mode for the block unit, one of the predictors based on the neighboring blocks for each of the block elements. In the implementation, the encoder module 1012 predicts the block unit to generate a plurality of residual samples based on the predictors, and provide the bitstream including a plurality of coefficients corresponding to the residual samples.

In at least one implementation, the encoder module 1012 may perform the mode list adjustment for intra prediction as shown in FIG. 6A and FIG. 6B. The methods in FIG. 6A and FIG. 6B may be carried out using the configurations illustrated in FIG. 1 and FIG. 10, for example, and various elements of these figures are referenced in explaining the example method. In addition, the procedure and the result for the method in FIG. 6A carried out using the configurations illustrated in FIG. 1 and FIG. 10 are substantially identical to those for the method in FIG. 6A carried out using the configurations illustrated in FIG. 1 and FIG. 2. The procedure and the result for the method in FIG. 6B carried out using the configurations illustrated in FIG. 1 and FIG. 10 are substantially identical to those for the method in FIG. 6B carried out using the configurations illustrated in FIG. 1 and FIG. 2. Furthermore, the orders of blocks in FIG. 6A and FIG. 6B for the encoder module 1012 are illustrative only and may change. Additional blocks may be added or less blocks may be utilized without departing from this disclosure.

Figure 12A:
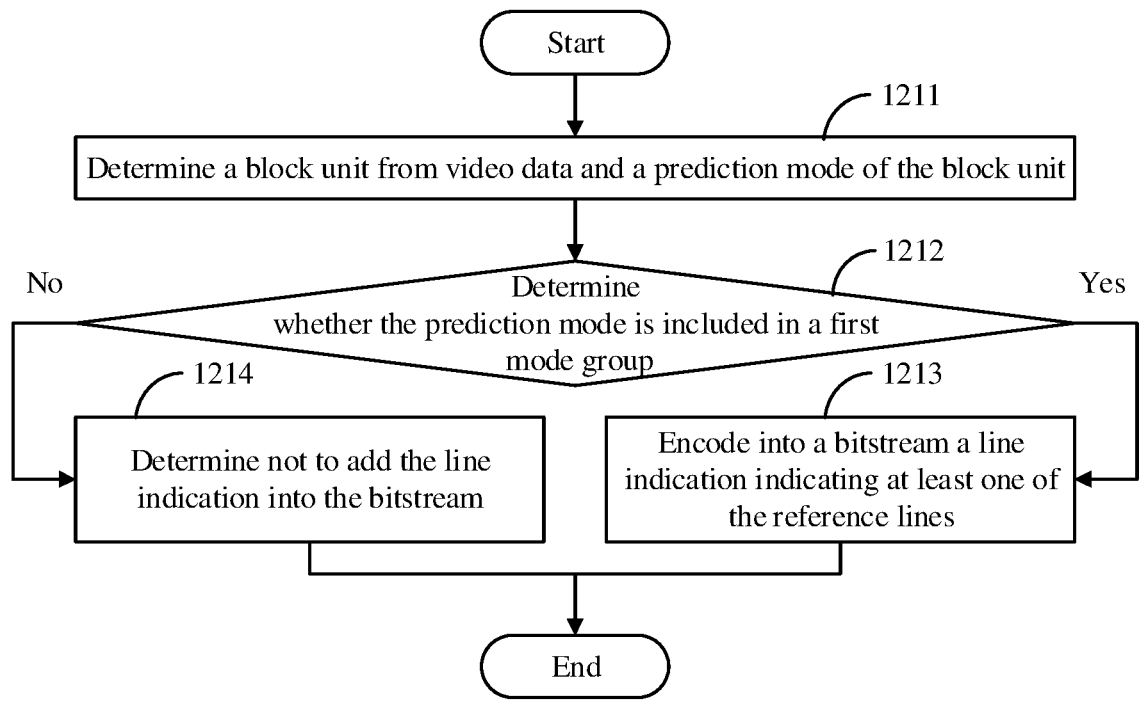
FIGS. 12A and 12B illustrate two flowcharts in accordance with a third exemplary implementation and a fourth exemplary implementation, respectively, of the multi-reference line prediction for chroma prediction.

FIG. 12A illustrates a flowchart in accordance with a third exemplary implementation of the multi-reference line prediction for chroma prediction. The example method is provided by way of example only, as there are a variety of ways to carry out the method. The method described below may be carried out using the configurations illustrated in FIG. 1 and FIG. 10, for example, and various elements of these figures are referenced in explaining the example method. Each block shown in FIG. 12A represents one or more processes, methods, or subroutines, carried out in the example method. Furthermore, the order of blocks is illustrative only and may change. Additional blocks may be added or less blocks may be utilized without departing from this disclosure.

At block 1211, the encoder module 1012 determines a block unit from the video data, and a prediction mode of the block unit.

In at least one implementation, the video data may be a video. The source device 11 may receive the video by the source module 111. The encoder module 1012 determines the image frame from the video, and divides the image frame to determine the block unit.

In at least one implementation, the prediction process unit 10121 of the source device 11 determines the block unit from the video via the partition unit 101211, and then the encoder module 1012 provides a plurality of partition indications into a bitstream based on a partition result of the partition unit 101211.

In at least one implementation, the prediction process unit 10121 may select one of coding results generated according to a plurality of candidate modes by the intra prediction unit 101212 based on a mode selection method, such as a cost function. In at least one implementation, the mode selection method may be a rate-distortion optimization (RDO) process.

In the implementation, the prediction process unit 10121 sets one of the candidate modes used to generate the selected coding result as the prediction mode. In at least one implementation, the candidate modes may include a plurality of direct modes (DMs), a plurality of most probable modes (MPMs) and a plurality of linear modes (LMs). In the implementation, the LMs may include a linear model mode, a multiple-model linear mode (MMLM), and a multiple-filter linear mode (MFLM). In one implementation, the intra prediction unit 101212 may predict the block unit 900 based on a plurality of reconstructed samples in one of the reference lines 910-913 in FIG. 9, when the prediction mode is selected from the LMs. In the implementation, the one of the reference lines may be predefined as a first one of the reference lines. In another implementation, the intra prediction unit 101212 may predict the block unit based on the reconstructed samples in at least one of the reference lines, when the prediction mode is selected from the DMs and MPMs.

At block 1212, the prediction process unit 10121 determines whether the prediction mode is included in a first mode group. When the prediction mode is included in the first mode group, the procedure proceeds to block 813. When the prediction mode is not included in the first mode group, the procedure proceeds to block 814.

In at least one implementation, the source device 11 and the destination device 12 may separate the candidate modes into a plurality of mode groups. In the implementation, the first mode group may include a plurality of first candidate modes, and a second mode group may include a plurality of second candidate modes. In one implementation, the prediction process unit 10121 may predict the block unit based on the reconstructed samples in one or more than one of the reference lines, when the prediction process unit 10121 determines to predict the block unit based on a specific one of the first candidate modes. Thus, the entropy encoding unit 10128 needs to further encode into a bitstream a line indication indicating how to select the at least one of the reference lines for the decoder module 122. In one implementation, the encoder module 1012 may predict the block unit based on the reconstructed samples in the predefined one of the reference lines, when the encoder module 1012 determines to predict the block unit based on a specific one of the second candidate modes. Thus, the entropy encoding unit 10128 may not encode the line indication, since the predefined one of the reference lines is predefined in the destination device 12. In one implementation, the first candidate modes may be the DMs, and the MPMs, and the second candidate modes may be the LMs.

At block 1213, the entropy encoding unit 10128 encodes into the bitstream the line indication indicating the at least one of the reference lines.

In at least one implementation, the line indication may be a line index. In one implementation, the line index may indicate the quantity of the at least one of the reference lines. For example, the number of the at least one reference lines may equal to one, when the line index is equal to zero. In one implementation, the line index may be set to be equal to zero, when the at least one of the reference lines only include the first reference line. In one implementation, the line index may be set to be equal to one, when the at least one reference lines only includes the second reference line. In another implementation, the line index may be set to be equal to one, when the at least one reference lines is a combination of the first reference line and the second reference line.

At block 1214, the encoder module 1012 determines not to add the line indication into the bitstream for the block unit.

In at least one implementation, the entropy encoding unit 10128 may not encode the line indication, since the predefined one of the reference lines is predefined in the destination device 12.

Figure 12B:
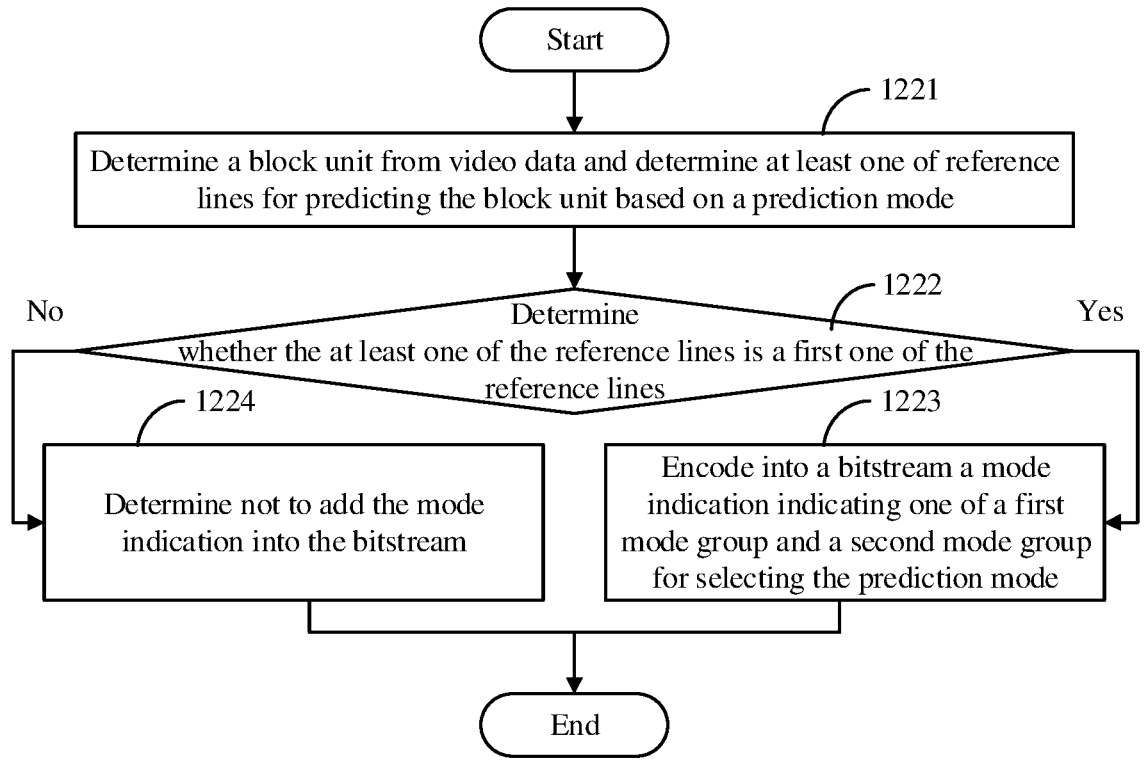

FIG. 12B illustrates a flowchart in accordance with a fourth exemplary implementation of the multi-reference line prediction for chroma prediction. The example method is provided by way of example only, as there are a variety of ways to carry out the method. The method described below may be carried out using the configurations illustrated in FIG. 1 and FIG. 10, for example, and various elements of these figures are referenced in explaining the example method. Each block shown in FIG. 12B represents one or more processes, methods, or subroutines, carried out in the example method. Furthermore, the order of blocks is illustrative only and may change. Additional blocks may be added or less blocks may be utilized without departing from this disclosure.

At block 1221, the encoder module 1012 determines a block unit from the video data, and determines at least one of reference lines for predicting the block unit based on a prediction mode.

In at least one implementation, the video data may be a video. The source device 11 may receive the video by the source module 111. The encoder module 1012 determines the image frame from the video, and divides the image frame to determine the block unit.

In at least one implementation, the prediction process unit 10121 of the source device 11 determines the block unit from the video via the partition unit 101211, and then the encoder module 1012 provides a plurality of partition indications into a bitstream based on a partition result of the partition unit 101211.

In at least one implementation, the intra prediction unit 101212 may determine a plurality of reconstructed samples in the reference lines 910-913 in FIG. 9. In one implementation, the number L of the reference lines may be an integer greater than one.

In at least one implementation, the prediction process unit 10121 may select one of coding results generated according to a plurality of candidate modes by the intra prediction unit 101212 based on a mode selection method, such as a cost function. In at least one implementation, the mode selection method may be a rate-distortion optimization (RDO) process. In the implementation, the prediction process unit 10121 sets one of the candidate modes used to generate the selected coding result based on the at least one of the reference lines as the prediction mode.

At block 1222, the prediction process unit 10121 determines whether the least one of the reference lines is a first one of the reference lines. When the least one of the reference lines is the first reference line, the procedure proceeds to block 1223. When the least one of the reference lines includes the other reference lines different from the first reference line, the procedure proceeds to block 1224.

In at least one implementation, the prediction mode is selected from a plurality of candidate modes. In at least one implementation, the candidate modes may include a plurality of direct modes (DMs), a plurality of most probable modes (MPMs) and a plurality of linear modes (LMs). In the implementation, the LMs may include a linear model mode, a multiple-model linear mode (MMLM), and a multiple-filter linear mode (MFLM).

In at least one implementation, the source device 11 and the destination device 12 may separate the candidate modes into a plurality of mode groups. In the implementation, the first mode group may include a plurality of first candidate modes, and a second mode group may include a plurality of second candidate modes. In one implementation, the first candidate modes may be the DMs, and the MPMs, and the second candidate modes may be the LMs.

In at least one implementation, the prediction mode may be selected from the first candidate modes and the second candidate modes, when the prediction process unit 10121 determines to predict the block unit based on the reconstructed samples in the predefined one of the reference lines according to the prediction mode. Thus, the entropy encoding unit 10128 needs to further encode into a bitstream a mode indication indicating one of the first mode group and the second mode group. In one implementation, the prediction mode is only selected from the first candidate modes, when the prediction process unit 10121 determines the at least one of the reference lines includes one of the reference lines different from the predefined one of the reference lines. Thus, the entropy encoding unit 10128 may not encode the mode indication, since the destination device 12 may directly select the first mode group based on the at least one of the reference lines.

At block 1223, the entropy encoding unit 10128 encodes into the bitstream the mode indication indicating one of the first mode group and the second mode group for selecting the prediction mode.

In at least one implementation, the mode indication may be a group index. When the group index indicates that the prediction mode is selected from the first mode group, the entropy encoding unit 10128 may further encode into the bitstream a first mode flag for the destination device 12 to select the prediction mode from the first candidate modes. When the group index indicates that the prediction mode is selected from the second mode group, the entropy encoding unit 10128 may further encode into the bitstream a second mode flag for the destination device 12 to select the prediction mode from the second candidate modes.

At block 1224, the encoder module 1012 determines not to add the mode indication into the bitstream for the block unit.

In at least one implementation, the entropy encoding unit 10128 may not encode the mode indication, since the destination device 12 may directly select the first mode group based on the at least one of the reference lines. Then, the entropy encoding unit 10128 may further encodes into the bitstream the first mode flag for the destination device 12 to select the prediction mode from the first candidate mode.

From the above description, it is manifest that various techniques may be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of decoding a bitstream by an electronic device, the method comprising:
   determining a block unit from an image frame according to the bitstream;
   determining a mode list including a plurality of default modes and a plurality of added modes, wherein each of the plurality of added modes is mutually different from the plurality of default modes;
   determining whether a specific one of the plurality of default modes is replaced by one of the plurality of added modes;
   determining a prediction mode from the plurality of added modes, when the specific one of the plurality of default modes is replaced;
   determining the specific one of the plurality of default modes as the prediction mode, when the specific one of the plurality of default modes remains unchanged; and
   reconstructing the block unit based on the prediction mode.

2. The method according to claim 1, wherein the plurality of default modes includes a plurality of outmost modes, and the specific one of the plurality of default modes is one of the plurality of outmost modes when the specific one of the plurality of default modes is replaced.

3. The method according to claim 1, wherein the mode list includes a plurality of candidate modes separated into a first mode group and a second mode group, the second mode group is generated by separating the plurality of candidate modes of the first mode group from the mode list, the plurality of candidate modes in the first mode group is identical to the plurality of default modes, and the plurality of candidate modes in the second mode group is identical to the plurality of added modes for replacing the plurality of default modes.

4. The method according to claim 1, further comprising:
   determining a first candidate list including the plurality of default modes, when each of the plurality of default modes remains unremoved; and
   determining a second candidate list including at least one of the plurality of added modes and a plurality of remaining modes selected from the plurality of default modes, when at least one of the plurality of default modes is replaced by the at least one of the plurality of added modes, and other of the plurality of default modes are set as the plurality of remaining modes.

5. The method according to claim 4, wherein the number of the at least one of the plurality of default modes is equal to a number of the at least one of the plurality of added modes, and the number of the plurality of default modes is equal to a sum of a number of the plurality of remaining modes and the number of the at least one of the plurality of added modes.

6. The method according to claim 4, further comprising:
   selecting one of the first candidate list and the second candidate list; and
   determining the prediction mode from the selected one of the first candidate list and the second candidate list.

7. The method according to claim 6, wherein the first candidate list and the second candidate list is selected based on a prediction indication.

8. The method according to claim 6, wherein a plurality of reconstructed blocks neighboring with the block unit are located at a plurality of sample positions, and the first candidate list and the second candidate list is selected based on the plurality of sample positions.

9. An electronic device for decoding a bitstream, the electronic device comprising:
   at least one processor; and
   a storage device coupled to the at least one processor and storing a plurality of instructions which, when executed by the at least one processor, causes the at least one processor to:
      determine a block unit from an image frame according to the bitstream;
      determine a mode list including a plurality of first candidate modes and a plurality of second candidate modes, wherein each of the plurality of second candidate modes is mutually different the first candidate modes;
      determine whether a specific one of the plurality of first candidate modes is replaced by one of the plurality of second candidate modes;
      determine a prediction mode from the plurality of second candidate modes, when the specific one of the plurality of first candidate modes is replaced;
      determine the specific one of the plurality of first candidate modes as the prediction mode, when the specific one of the plurality of first candidate modes remains unremoved; and
      reconstruct the block unit based on the prediction mode.

10. The electronic device according to claim 9, wherein the plurality of instructions, when executed by the at least one processor, further causes the at least one processor to:
    determine a first candidate list including the plurality of first candidate modes, when each of the plurality of first candidate modes remains unremoved;
    determine a second candidate list including a plurality of remaining modes and at least one of the plurality of second candidate modes, when at least one of the plurality of first candidate modes is replaced by the at least one of the plurality of second candidate modes, and other of the plurality of first candidate modes are set as the plurality of remaining modes;
    select one of the first candidate list and the second candidate list; and
    determine the prediction mode from the selected one of the first candidate list and the second candidate list.

11. The electronic device according to claim 10, wherein the selected one of the first candidate list and the second candidate list is determined based on a prediction indication.

12. The electronic device according to claim 10, wherein a plurality of reconstructed blocks neighboring with the block unit are located at a plurality of sample positions, and the first candidate list and the second candidate list is selected based on the plurality of sample positions.

13. The method according to claim 10, wherein a number of the at least one of the plurality of first candidate modes is equal to a number of the at least one of the plurality of second candidate modes, and the number of the plurality of first candidate modes is equal to a sum of a number of the plurality of remaining modes and the number of the at least one of the plurality of second candidate modes.

14. The electronic device according to claim 9, wherein the plurality of first candidate modes includes a plurality of outmost modes, and the specific one of the plurality of first candidate modes is one of the plurality of outmost modes when the specific one of the plurality of first candidate modes is replaced.

15. A method of decoding a bitstream by an electronic device, the method comprising:

determining a block unit from an image frame according to the bitstream;

determining an intra prediction indication of the block unit from the bitstream;

determining a mode list including a plurality of candidate modes separated in a first mode group and a second mode group, wherein each of the plurality of candidate modes in the first mode group is excluded from the second mode group;

selecting a specific one of the plurality of candidate modes in the mode list from at least one of the plurality of candidate modes in the second mode group based on the intra prediction indication, when at least one of the plurality of candidate modes in the first mode group is replaced by the at least one of the plurality of candidate modes in the second mode group;

selecting the specific one of the plurality of candidate modes in the mode list from the plurality of candidate modes in the first mode group based on the intra prediction indication, when each of the plurality of candidate modes in the first mode group remains unremoved; and reconstructing the block unit of the image frame based on the specific one of the plurality of candidate modes in the mode list.

16. The method according to claim 15, wherein a plurality of replaced candidate modes in the first mode group are selected from a plurality of outmost modes of the first mode group.

17. The method according to claim 15, wherein a number of the plurality of replaced candidate modes in the first mode group is equal to a number of the at least one of the plurality of candidate modes in the second mode group.

18. The method according to claim 15, further comprising:

determining, based on the intra prediction indication, whether a plurality of replaced candidate modes in the first mode group are replaced by the at least one of the plurality of candidate modes in the second mode group.

19. The method according to claim 15, further comprising:

determining, based on a plurality of sample positions, whether a plurality of replaced candidate modes in the first mode group are replaced by the at least one of the plurality of candidate modes in the second mode group, wherein a plurality of reconstructed blocks neighboring the block unit and reconstructed prior to the block unit are located at the plurality of sample position.

20. The method according to claim 1, wherein the plurality of default modes is a planar mode, a DC mode and a plurality of first direction modes, the plurality of added modes is a plurality of second directional modes for replacing the plurality of first directional modes, each of the plurality of first direction modes and the plurality of second directional modes has an intra prediction angle, and the intra prediction angles of the plurality of second directional modes are different from the intra prediction angles of the plurality of first directional modes.

* * * * *